US 8,738,268 B2

(12) United States Patent
Karimi et al.

(10) Patent No.: US 8,738,268 B2
(45) Date of Patent: May 27, 2014

(54) VEHICLE ELECTRICAL POWER MANAGEMENT AND DISTRIBUTION

(75) Inventors: Kamiar J. Karimi, Kirkland, WA (US); Shengyi Liu, Sammamish, WA (US); Mark E. Liffring, Seattle, WA (US); Steven B. Helton, Redmond, WA (US); Sheau-Wei (Johnny) Fu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 13/045,382

(22) Filed: Mar. 10, 2011

(65) Prior Publication Data

US 2012/0232728 A1    Sep. 13, 2012

(51) Int. Cl.
*G06F 19/00*    (2011.01)
*G06G 7/70*    (2006.01)

(52) U.S. Cl.
USPC .................. 701/99; 701/3; 701/22; 244/53 R; 244/60; 307/11; 307/18; 307/31; 307/43; 307/84; 700/20; 700/286; 700/295; 700/297; 60/668

(58) Field of Classification Search
USPC ............. 701/1, 3, 22, 99; 307/9.1, 11, 18, 31, 307/32, 38, 39, 43, 64, 82, 83, 84; 700/20, 700/28, 286, 295, 297; 60/668, 698, 705, 60/706, 716; 180/65.8, 65.1; 244/53 R, 58, 244/60, 75.1, 76 R
See application file for complete search history.

(56) References Cited

U.S. PATENT DOCUMENTS 2,016,253 A   10/1935  Noblitt et al.
2,512,155 A   6/1950   Hill (Continued)

FOREIGN PATENT DOCUMENTS

CA    2261730 C    2/1998
DE    69712210 T2  10/2002

(Continued)

OTHER PUBLICATIONS

Fromherz et al., Coordinated Control for Highly Reconfigurable Systems [Invited Paper and Presentation], HSCC 2005, Mar. 2005, Palo Alto Research Center, (37 pgs).

(Continued)

*Primary Examiner* — Rami Khatib
(74) *Attorney, Agent, or Firm* — Toler Law Group, PC

(57) ABSTRACT

Vehicles, systems, and methods are disclosed for providing and directing first power, such as vehicle generator power, and alternate sources of power. In a particular embodiment, a vehicle includes a power distribution grid that includes a plurality of power sources and a plurality of distributions buses configured to distribute power from the plurality of power sources. The plurality of power sources include an engine-driven power source is configured to provide first power where the first power has first power characteristics. The plurality of power sources also includes a plurality of engine-independent power sources including a first alternate power source configured to provide first alternate power. The first alternate power has first alternate power characteristics that are different than the first power characteristics. The plurality of engine-independent power sources also includes a second alternate power source configured to provide second alternate power. The second alternate power has second alternate power characteristics that are different from the first power characteristics and different from the first alternate power characteristics. The vehicle also includes a global controller that sends control signals to control generation of power by the engine-driven power source, the first alternate power source and the second alternate power source via the plurality of distribution buses responsive to power demand of the power distribution grid.

20 Claims, 8 Drawing Sheets

(56) References Cited

U.S. PATENT DOCUMENTS

| | | |
|---|---|---|
| 2,777,301 A | 1/1957 | Kuhn |
| 2,953,325 A | 9/1960 | Hadekel |
| 2,960,825 A | 11/1960 | Sampietro et al. |
| 2,988,302 A | 6/1961 | Smith |
| 3,033,307 A | 5/1962 | Sanders et al. |
| 3,057,170 A | 10/1962 | Brahm |
| 3,057,583 A | 10/1962 | Majendie et al. |
| 3,060,684 A | 10/1962 | Holmes |
| 3,105,631 A | 10/1963 | Hanny |
| 3,177,679 A | 4/1965 | Quick et al. |
| 3,194,026 A | 7/1965 | La Fleur |
| 3,321,930 A | 5/1967 | La Fleur |
| 3,353,626 A | 11/1967 | Cremer et al. |
| 3,382,671 A | 5/1968 | Ehni, III |
| 3,437,173 A | 4/1969 | Ehrich |
| 3,439,774 A | 4/1969 | Callaway et al. |
| 3,519,843 A | 7/1970 | Trautman |
| 3,648,803 A | 3/1972 | Heath et al. |
| 3,680,660 A | 8/1972 | DuBois |
| 3,683,749 A | 8/1972 | Bayles |
| 3,764,815 A | 10/1973 | Habock et al. |
| 3,913,702 A | 10/1975 | Wirt et al. |
| 3,920,095 A | 11/1975 | Clark |
| 4,001,892 A | 1/1977 | Castelli et al. |
| 4,064,961 A | 12/1977 | Tseo |
| 4,091,613 A | 5/1978 | Young |
| 4,091,892 A | 5/1978 | Hehmann et al. |
| 4,137,992 A | 2/1979 | Herman |
| 4,226,297 A | 10/1980 | Cicon |
| 4,244,441 A | 1/1981 | Tolman |
| 4,312,191 A | 1/1982 | Biagini |
| 4,314,621 A | 2/1982 | Hansen |
| 4,359,136 A | 11/1982 | Eriksson |
| 4,360,075 A | 11/1982 | Blaser et al. |
| 4,370,560 A | 1/1983 | Faulkner et al. |
| 4,371,053 A | 2/1983 | Jones |
| 4,418,879 A | 12/1983 | Vanderleest |
| 4,419,926 A | 12/1983 | Cronin et al. |
| 4,426,911 A | 1/1984 | Robinson et al. |
| 4,434,624 A | 3/1984 | Cronin et al. |
| 4,456,830 A | 6/1984 | Cronin |
| 4,462,561 A | 7/1984 | Cronin |
| 4,494,372 A | 1/1985 | Cronin |
| 4,503,666 A | 3/1985 | Christoff |
| 4,514,976 A | 5/1985 | Christoff |
| 4,523,517 A | 6/1985 | Cronin |
| 4,533,097 A | 8/1985 | Aldrich |
| 4,546,939 A | 10/1985 | Cronin |
| 4,645,032 A | 2/1987 | Ross et al. |
| 4,684,081 A | 8/1987 | Cronin |
| 4,694,654 A | 9/1987 | Kawamura |
| 4,706,908 A | 11/1987 | Huffman et al. |
| 4,742,760 A | 5/1988 | Horstman et al. |
| 4,744,440 A | 5/1988 | Hanson |
| 4,759,515 A | 7/1988 | Carl |
| 4,762,294 A | 8/1988 | Carl |
| 4,910,414 A | 3/1990 | Krebs |
| 4,979,587 A | 12/1990 | Hirt et al. |
| 5,074,495 A | 12/1991 | Raymond |
| 5,145,124 A | 9/1992 | Brunskill et al. |
| 5,152,141 A | 10/1992 | Rumford et al. |
| 5,162,620 A | 11/1992 | Ross et al. |
| 5,217,187 A | 6/1993 | Criswell |
| 5,268,541 A | 12/1993 | Pettersson |
| 5,299,763 A | 4/1994 | Bescoby et al. |
| 5,309,029 A | 5/1994 | Gregory et al. |
| 5,323,603 A | 6/1994 | Malohn |
| 5,365,025 A | 11/1994 | Kraai et al. |
| 5,490,645 A | 2/1996 | Woodhouse |
| 5,535,601 A | 7/1996 | Teraoka |
| 5,627,744 A | 5/1997 | Baker et al. |
| 5,655,359 A | 8/1997 | Campbell et al. |
| 5,695,396 A | 12/1997 | Markwart et al. |
| 5,709,103 A | 1/1998 | Williams |
| 5,734,239 A | 3/1998 | Turner |
| 5,735,116 A | 4/1998 | Mouton |
| 5,791,982 A | 8/1998 | Curry et al. |
| 5,813,630 A | 9/1998 | Williams |
| 5,865,602 A | 2/1999 | Nozari |
| 5,899,085 A | 5/1999 | Williams |
| 5,899,411 A | 5/1999 | Latos et al. |
| 5,902,970 A | 5/1999 | Ferri |
| 5,967,461 A | 10/1999 | Farrington |
| 5,977,645 A | 11/1999 | Glennon |
| 6,018,233 A | 1/2000 | Glennon |
| 6,039,287 A | 3/2000 | Liston et al. |
| 6,092,360 A | 7/2000 | Hoag et al. |
| 6,142,418 A | 11/2000 | Weber et al. |
| 6,158,546 A | 12/2000 | Hanson et al. |
| 6,241,182 B1 | 6/2001 | Durandeau et al. |
| 6,244,539 B1 | 6/2001 | Liston et al. |
| 6,264,137 B1 | 7/2001 | Sheoran |
| 6,272,838 B1 | 8/2001 | Harvell et al. |
| 6,296,957 B1 | 10/2001 | Graage |
| 6,308,915 B1 | 10/2001 | Liston et al. |
| 6,344,700 B1 | 2/2002 | Eisenhauer et al. |
| 6,360,844 B2 | 3/2002 | Hogeboom et al. |
| 6,467,725 B1 | 10/2002 | Coles et al. |
| 6,491,254 B1 | 12/2002 | Walkinshaw et al. |
| 6,508,219 B2 | 1/2003 | Schorn |
| 6,526,775 B1 | 3/2003 | Asfia et al. |
| 6,615,576 B2 | 9/2003 | Sheoran et al. |
| 6,651,929 B2 | 11/2003 | Dionne |
| 6,664,656 B2 | 12/2003 | Bernier |
| 6,681,592 B1 | 1/2004 | Lents et al. |
| 6,695,094 B2 | 2/2004 | Moffat et al. |
| 6,698,180 B2 | 3/2004 | Snyder |
| 6,704,625 B2 | 3/2004 | Albero et al. |
| 6,735,951 B2 | 5/2004 | Thompson |
| 6,755,375 B2 | 6/2004 | Trikha |
| 6,777,822 B1 | 8/2004 | Suttie et al. |
| 6,834,831 B2 | 12/2004 | Daggett |
| 6,884,636 B2 | 4/2005 | Fiorini et al. |
| 6,928,832 B2 | 8/2005 | Lents et al. |
| 6,953,100 B2 | 10/2005 | Aberle et al. |
| 6,995,993 B2 | 2/2006 | Sarlioglu et al. |
| 7,024,874 B2 | 4/2006 | Zywiak et al. |
| 7,098,555 B2 | 8/2006 | Glahn et al. |
| 7,121,100 B2 | 10/2006 | Atkey et al. |
| 7,207,521 B2 | 4/2007 | Atkey et al. |
| 7,210,652 B2 | 5/2007 | Hein et al |
| 7,210,653 B2 | 5/2007 | Atkey et al. |
| 7,222,001 B2 | 5/2007 | Frost et al. |
| 7,267,297 B2 | 9/2007 | Campbell et al. |
| 7,285,753 B2 | 10/2007 | Hoehne et al. |
| 7,285,871 B2 | 10/2007 | Derouineau |
| 7,334,422 B2 | 2/2008 | Zywiak et al. |
| 7,344,107 B2 | 3/2008 | Campbell et al. |
| 7,364,116 B2 | 4/2008 | Nguyen et al. |
| 7,373,222 B1 | 5/2008 | Wright et al. |
| 7,400,065 B2 | 7/2008 | Michalko |
| 7,406,370 B2 | 7/2008 | Kojori et al. |
| 7,431,238 B2 | 10/2008 | Hoffjann et al. |
| 7,513,119 B2 | 4/2009 | Zielinski et al. |
| 7,523,622 B2 | 4/2009 | Zywiak et al. |
| 7,550,866 B2 | 6/2009 | Breit et al. |
| 7,687,927 B2 | 3/2010 | Shander et al. |
| 7,872,368 B2 | 1/2011 | Karimi et al. |
| 7,950,606 B2 | 5/2011 | Atkey et al. |
| 8,049,360 B2 | 11/2011 | Karimi et al. |
| 8,232,670 B2 | 7/2012 | Breit et al. |
| 8,319,370 B2 * | 11/2012 | Itoh et al. ................. 307/21 |
| 2004/0061380 A1 | 4/2004 | Hann et al. |
| 2005/0121978 A1 | 6/2005 | McAvoy |
| 2005/0151517 A1 * | 7/2005 | Cook et al. ................. 323/207 |
| 2005/0178903 A1 | 8/2005 | Boorman et al. |
| 2005/0231038 A1 | 10/2005 | Marin-Martinod et al. |
| 2006/0061213 A1 | 3/2006 | Michalko |
| 2006/0085100 A1 | 4/2006 | Marin-Martinod et al. |
| 2006/0168968 A1 | 8/2006 | Zielinski et al. |
| 2006/0219842 A1 | 10/2006 | Shell et al. |
| 2006/0267406 A1 | 11/2006 | Mehrer et al. |
| 2007/0023210 A1 | 2/2007 | Bernardi et al. |
| 2007/0063098 A1 | 3/2007 | Dionne |

| | | | |
|---|---|---|---|
| 2007/0069078 | A1 | 3/2007 | Hoffjann et al. |
| 2007/0110861 | A1 | 5/2007 | Hoffjann et al. |
| 2007/0120014 | A1 | 5/2007 | Elmers et al. |
| 2007/0267540 | A1 | 11/2007 | Atkey et al. |
| 2007/0284480 | A1 | 12/2007 | Atkey et al. |
| 2008/0001026 | A1 | 1/2008 | Holffjann et al. |
| 2008/0038597 | A1 | 2/2008 | Hoffjann et al. |
| 2008/0058998 | A1 | 3/2008 | Breit |
| 2008/0077802 | A1 | 3/2008 | Richardson et al. |
| 2008/0127411 | A1 | 6/2008 | Hoffjann et al. |
| 2008/0150356 | A1 | 6/2008 | Breit et al. |
| 2008/0191094 | A1 | 8/2008 | Heinrich et al. |
| 2008/0246337 | A1 | 10/2008 | Michalko |
| 2008/0283663 | A1 | 11/2008 | Space et al. |
| 2009/0015063 | A1* | 1/2009 | Michalko ........................ 307/19 |
| 2009/0103221 | A1 | 4/2009 | Aronson et al. |
| 2009/0118874 | A1 | 5/2009 | White et al. |
| 2009/0152942 | A1 | 6/2009 | Waite et al. |
| 2009/0218888 | A1 | 9/2009 | Lorhammer et al. |
| 2010/0102625 | A1 | 4/2010 | Karimi et al. |
| 2010/0193630 | A1 | 8/2010 | Duces et al. |
| 2010/0203818 | A1 | 8/2010 | Gray et al. |
| 2010/0221642 | A1 | 9/2010 | Frahm et al. |
| 2010/0259859 | A1* | 10/2010 | Prabhu K et al. ............... 361/62 |
| 2010/0283318 | A1* | 11/2010 | Crane et al. .................... 307/9.1 |
| 2011/0039171 | A1 | 2/2011 | Hibbs et al. |
| 2012/0056474 | A1* | 3/2012 | Larson et al. .................. 307/9.1 |

FOREIGN PATENT DOCUMENTS

| | | |
|---|---|---|
| DE | 69712797 T2 | 11/2002 |
| DE | 10249588 A1 | 5/2004 |
| EP | 0888966 A2 | 1/1999 |
| EP | 0923488 B1 | 4/2002 |
| EP | 1010618 B1 | 5/2002 |
| EP | 1650846 | 4/2006 |
| EP | 1686058 A1 | 8/2006 |
| EP | 1686055 B1 | 11/2007 |
| JP | 57113919 A | 7/1982 |
| JP | 05163925 A | 6/1993 |
| JP | 2000516533 A | 12/2000 |
| WO | 9805553 A1 | 2/1998 |
| WO | 0147100 A1 | 6/2001 |
| WO | 02066323 A2 | 8/2002 |
| WO | 2004037641 A2 | 5/2004 |
| WO | 2006058774 A2 | 6/2006 |
| WO | WO 2008113850 | 9/2008 |

OTHER PUBLICATIONS

Jennifer Ernst, Embedded Reasoning: Model-based design for highly reconfigurable systems, 2006, Palo Alto Research Center, (5 pgs).

Zelazo et al., Adaptive Load Management, University of Washington—Aeronautics and Astronautics, Sep. 17, 2007, (40 pgs).

PCT International Search Report and Written Opinion of the International Searching Authority, International Application No. PCT/US2009/057540, Jun. 29, 2010, European Patent Office, (10 pgs.).

International Search Report and Written Opinion of the International Searching Authority, International Application No. PCT/US2012/024688, European Patent Office, Jun. 28, 2012, (15 pgs).

"Aeronautical Engineering; Construction of the Shetland", The Aeroplane Magazine, Dec. 7, 1945, pp. 661-667.

"All-Electric Aircraft", IEEE/AESS Symposium, Dayton, Ohio, Nov. 30, 1983, vol. I and vol. II, IEEE, Piscataway, New Jersey, 92 pages.

"Meeting Minutes from the NASA PBW Critical Design Review (CDR)", Jun. 10-12, 1996, McDonnell Douglas Aerospace, Long Beach, California, 524 pages.

"Model 'A' Ford Tapered Muffler", Aries Limited, retrieved on May 28, 2004, Saratoga, CA, 1 page.

"Short Shetland—Review of Britain's Largest Aircraft", Flight Magazine, May 17, 1945, Flight Magazine, pp. 529-534.

"The Shetland II", Flight Magazine, Dec. 6th, 1945, Flight Magazine, pp. 607-608.

"The Short Shetland", Aeronautics Magazine, Jul. 1945, pp. 38-39.

"What About Transfer Switches?" retrieved from http://www.generatorjoe.net/html/WhatAboutsws.asp, accessed on Aug. 9, 2007, GeneratorJoe Inc., Santa Rosa, CA, pp. 1-8.

Brady, C., Image of AC & DC Metering panel, The Boeing 737 Technical Site, accessed Aug. 9, 2007, 1 page.

Electrically Powered Actuators, Aerospatiale Matra Airbus 2000, 1 page.

European Patent Office Extended European Search Report for EP Patent Application EP10250159.0-2422/2213571, dated Oct. 31, 2011, 7 pages.

Figure 5 from p. 13 of Boeing Airliner Magazine, Oct.-Dec. '94, p. 13.

GE Develops a Starter/Generator with Pentek Boards, Written in the Summer of 1994, Updated: Summer 1996, 2 pages.

International Search Report for Application No. PCT/US03/33542 mailed Jun. 1, 2004, 6 pages.

"F-16 Test Aircraft Completes Long Distinguished Career", Air Force Research Laboratory/AFRL, Science and Technology for Tomorrow's Aerospace Forces, Success Stories, 2001, 2 pages.

Andrade, L. et al., "Design of the Boeing 777 Electric System," Proceedings of the IEEE 1992 National Aerospace and Electronics Conference (NAECON) 1992, May 1992, vol. 3, IEEE, Piscataway, New Jersey, pp. 1281-1290.

"Titanium Oval Muffler", Michael Andretti Powersports, retrieved on May 28, 2004, 2 pages.

Brady, C. "Auxiliary Power Unit the APU described", The Boeing 737 Technical Site, <http://www.b737.org.uk/apu.htm>, updated Jun. 18, 2007, accessed Aug. 9, 2007, pp. 1-12.

Cartier, J.C., "Power Quality Analysis in a CC-130 Hercules Aircraft Power Distribution System", Master of Engineering Thesis, Jan. 1999, Department of Electrical and Computer Engineering, Royal Military College of Canada, Kingston, Ontario, pp. 1-106 and appendices.

Chang, M. et al., "Preliminary (Issue #1) Power-by-Wire Development and Demonstration—Electrical Power Center Module Requirements and Specifications", Report No. MDS 93K0460, Nov. 1994, NASA, pp. 1-55 and appendices.

Chang, M. et al., "Preliminary (Issue #3) Power-by-Wire Development and Demonstration—Power Management and Distribution Requirements and Specifications", Report No. MDC 93K0451; Jun. 1995, NASA, pp. 1-64 and appendices.

"Henri Coanda", Internet biography retrieved on May 28, 2004, pp. 1-3.

Cronin, M.J., "The All-Electric Airplane as an Energy Efficient Transport", SAE Technical Paper 801131, Sep. 1, 1980, SAE International, Warrendale, PA, pp. 1-15.

Emadi, A. et al., "Electrical System Architectures for Future Aircraft", SAE Technical Paper 1999-01-2645, Aug. 2, 1999, SAE International, Warrendale, PA, pp. 1-5.

Feiner, L. et al, Power-By-Wire Program Plan, NASA Lewis Planning Meeting, Oct. 19, 1993, Cleveland, OH, 65 pages.

Fronista, G., "Electrical Actuation for Aircraft Flight Control Surfaces", retrieved from http://www.afrlhorizons.com/Briefs/Dec01/PR0103.htnnl, Dec. 2001, Air Force Research Laboratory's Propulsion Directorate, Power Division, Electrical Technology Branch, Wright-Patterson AFB, OH, 2 pages.

Glennon, T., "Fault Tolerant Generating and Distribution System Architecture", IEEE Colloquium on All Electric Aircraft (Digest No. 1998/260), Jun. 1998, IEEE, Pisctataway, New Jersey, pp. 1-4.

Goldberg, J. et al., "A Commercial Application of the Electro-Expulsive Deicing System", AAIA 98-DCHS, 36th Aerospace Sciences Meeting & Exhibit, Jan. 12-15, 1998, Reno, Nevada, 8 pages.

Electric flight systems: proceedings of a workshop held in Hampton, Virginia, Jun. 9-10, 1981, NASA Conference Publication 2209, Edited by Groom, N. et al, 1982, National Aeronautics and Space Administration Scientific and Technical Information Branch, Springfield, VA, 267 pages.

Holly, H., "The Closed-Loop Air-Cycle Option for Equipment Cooling on Aircraft", SAE Technical Paper 840940, Twelfth Intersociety Conference on Environmental Systems, Jul. 16-19, 1984, San Diego, CA, SAE, Warrendale, PA, 9 pages.

Holmdahl, M., "Putting New All Electric Technology Development to the Test", Proceedings of the IEEE 1983 National Aerospace and

(56) References Cited

OTHER PUBLICATIONS

Electronics Conference, NAECPM 1983, 1983, vol. 1, IEEE, Piscataway, New Jersey, pp. 74-79.

Jarck, B., "Electrical Power Systems", Second International Aeronautical Conference, New York, May 24-27, 1949, Institute of the Aeronautical Sciences, New York, pp. 447-448.

Murray, W.E. et al., "Evaluation of All-Electric Secondary Power for Transport Aircraft", NASA Contractor Report 189077, Jan. 24, 1992, National Technical Information Service, NTiS, U.S. Department of Commerce, Springfield, Virginia, 315 pages.

Rosenbush, F., "ECS Schemes for All Electric Airliners", SAE Technical Paper 820870, Twelfth Intersociety Conference on Environmental Systems, Jul. 19-21, 1982, San Diego, CA, 14 pages.

Sinnett, M., "787 No-Bleed Systems: Saving Fuel and Enhancing Operational Efficiencies", Aero Quarterly, 2007, 4th Quarter, AERO Magazine, Boeing Commercial Airplanes, Seattle, Washington, pp. 6-11.

Tagge, G., "Secondary Electric Power Generation with Minimum Engine Bleed", Aircraft Electric Secondary Power: Proceedings of a conference held at NASA Lewis Research Center, Cleveland Ohio, Sep. 14-15, 1982, NASA Conference Publication 2282, pp. 37-49.

Tagge, G.E. et al., "Systems Study for an Integrated Digital-Electric Aircraft" (IDEA), NASA Contractor Report 3840, Jan. 1985, National Technical Information Service, NTiS, U.S. Department of Commerce, Springfield, Virginia, pp. 1-209.

Wakefield, G., "Aircraft Electrical Engineering", Royal Aeronautical Society Textbook No. 4, 1959, Chapman & Hall Publishing, London, England, pp. 226, 248-249.

Weimer, J. A., "21st Century Plane Powering the United States Air Force", Presented at: Indiana Energy Technology Sizzle, Purdue University, Nov. 11, 2004, pp. 1-14.

Wild, T.W., "Transport Category Aircraft Systems", Jan. 1, 2008, 3rd Edition, Jeppesen Sanderson, Inc., Inverness, Colorado, 4 pages.

Williams, K., "Integrated Power Systems for Future Transport Aircraft", SAE Technical Paper 971247, Transport Aircraft Division; McDonnell Douglas Aerospace, Jun. 18, 1997, 9 pages.

Zeffert, H., "Principals and Practice of Aircraft Electrical Engineering", Aircraft Electrical Engineering, 1960, Newnes, London, England, pp. 32-33.

"Meeting Minutes from the NASA PBW Critical Design Review (CDR)", Jun. 10-12, 1996, McDonnell Douglas Aerospace, Long Beach, California.

Zeffert, H., "Principals and Practice of Aircraft Electrical Engineering", Aircraft Electrical Engineering, 1960, Newnes, London, England.

\* cited by examiner

VEHICLE ELECTRICAL POWER MANAGEMENT AND DISTRIBUTION

FIELD OF THE DISCLOSURE

The present disclosure is generally related to vehicle power systems.

BACKGROUND

A large or complex vehicle, such as a commercial aircraft, may include an electric power system that distributes power to various electrical subsystems at different voltage levels and different frequencies. For example, electrically-powered mechanical systems may use alternating current (AC) at relatively high voltage. By contrast, avionics systems conventionally operate on direct current (DC) at relatively low voltage. Other systems may also be present that use power of different characteristics.

On an aircraft, electrical power is typically generated by engine-driven generators. For example, power from an engine aboard the aircraft may be diverted to drive a generator. The electrical power may be converted using transformers, power electronics converters, or combination of both, and other devices to either alternating or direct current at different voltages used by subsystems. Diverting power from the engine increases engine fuel consumption, and the engines may not operate at their highest efficiency. It is desirable to increase efficiency of the aircraft and to decrease the cost of operating the aircraft.

SUMMARY

Systems and methods are disclosed that enable distribution of power to vehicle subsystems. When different subsystems use power having different characteristics, such as AC power versus DC power or power at different voltage levels, an engine-driven generator may provide a portion of the power and a plurality of engine-independent power sources, regarded as alternate power sources, may provide another portion of the power.

For example, the vehicle may be regarded as a system that includes a power distribution grid that supplies power to a plurality of subsystems. The power distribution grid may include multiple power sources and multiple power distribution buses that supply power of different characteristics. Power supplied by engine-driven generators may be regarded as generator power or first power that has particular characteristics. The particular characteristics of the first power may include, for example, AC power at high voltage, or DC power at high voltage. Power generated from engine-independent or alternate power sources may be regarded as alternate power that has different characteristics than the first power. Alternate power, such as AC or DC power at a different voltage level than the voltage level of the first power, may be used by various subsystems or load arrays aboard the vehicle. Alternate power sources independent of the engine may be used to provide alternate power to partially satisfy power demands or to fully satisfy power demands of subsystems or load arrays to reduce power extraction from engine. For one example, the power used by a particular load array may be entirely supplied by a particular alternate power source. For another example, the power used by the particular load array may be entirely supplied by converting a quantity of the first power, such as via a power distribution-conversion unit, into power having the power characteristics used by the particular load array. For still another example, power for the particular load array may be partially supplied by the alternate power source and partially by power converted from the first power, having first power characteristics, to power having the same power characteristics as the alternate power provided by the alternate power source. A power distribution-conversion unit may be used to convert a quantity of power to power having different power characteristics.

The engine-independent power sources, or alternative power sources, may be coupled to the distribution buses or the load arrays in different ways. An engine-independent or alternate power source may be coupled directly to a power distribution-conversion unit. The power distribution-conversion unit then converts alternate power produced by the engine-independent power source into power having characteristics of power used by a particular load array. Alternatively, if the engine-independent power source produces alternate power having characteristics used by a load array or a device coupled to a particular bus, the engine-independent power source may be coupled directly to a bus. Also, if the engine-independent power source produces alternate power having characteristics used by a particular subsystem or device, the engine-independent power source also may be coupled directly to the particular subsystem or device. Further, an engine-independent power source may be coupled to a control architecture where one or more controllers may determine whether alternate power produced by the engine-independent power source should be converted to power having different characteristics or to what bus, load-array, or subsystem the engine-independent power source should be coupled. The engine-independent power sources may reduce power demand on vehicle engines and, thus, may reduce fuel consumption or emissions resulting from fuel consumption.

In a particular embodiment, a vehicle includes a power distribution grid that includes a plurality of power sources and a plurality of distributions buses configured to distribute power from the plurality of power sources. The plurality of power sources include an engine-driven power source is configured to provide first power where the first power has first power characteristics. The plurality of power sources also includes a plurality of engine-independent power sources including a first alternate power source configured to provide first alternate power. The first alternate power has first alternate power characteristics that are different than the first power characteristics. The plurality of engine-independent power sources also includes a second alternate power source configured to provide second alternate power. The second alternate power has second alternate power characteristics that are different from the first power characteristics and different from the first alternate power characteristics. The vehicle also includes a global controller that sends control signals to control generation of power by the engine-driven power source, the first alternate power source and the second alternate power source via the plurality of distribution buses responsive to power demand of the power distribution grid.

In another particular embodiment, a method includes supplying first power having first power characteristics from a first power source. The method also includes supplying a first quantity of first alternate power having first alternate power characteristics used by a first subsystem. A quantity of the first power is converted to supply a second quantity of power having the first alternate power characteristics using a first converter. The second quantity of the power having the first alternate power characteristics is supplied to the first subsystem.

In still another particular embodiment, a system includes a first controller configured to control first power supplied to a first vehicle subsystem. The first power has first power characteristics. At least a portion of the first power is provided by a first engine-independent power source aboard a vehicle. The system also includes a global controller configured to receive signals from the first controller regarding power demand at the first vehicle subsystem and a quantity of the first power available from the first engine-independent power source.

The features, functions, and advantages that are described can be achieved independently in various embodiments or may be combined in yet other embodiments, further details of which are disclosed with reference to the following description and drawings.

DETAILED DESCRIPTION

Embodiments disclosed herein include systems and methods of providing power to vehicle subsystems and of controlling distribution of power to vehicle subsystems. In a particular embodiment, instead of relying on a first power (or generator power) provided by engine-driven generators or other generators, one or more vehicle subsystems receive alternate power from one or more engine-independent power sources. By using engine-independent power sources, or "alternate power sources" (e.g., a fuel cell system, a battery, a recuperative actuator, a supercapacitor, etc., that provide power independently of one or more engines), some power demand may be removed from the engine-drive generators. Removing some of the power demand from the engine-driven generators may make the vehicle more fuel efficient or may reduce vehicle operating emissions. Additionally, the alternate power sources may provide faster dynamic response to power demands, as well as improved power availability and reliability.

The alternate power from the engine-independent power source may be supplemented by converting a portion of the first power to a supply of power having power characteristics (e.g., alternating current, direct current, voltage level, etc.) like those of the alternate power source being supplemented. The engine-independent power source, power distribution-conversion unit that converts a portion of the first power to the supply of power having the characteristics of the alternate power, or both, may be located proximate the vehicle load array or vehicle load arrays that use the power having the alternate power characteristics. Positioning the alternate power sources or the power-distribution units near the vehicle load arrays that use the alternate power may reduce power losses and may reduce weight of wiring used to distribute power in the vehicle.

A control system may enable a determination of which engine-independent power sources may have excess power that may be shared with other subsystems. The control system also may enable supplementing the alternate power using the first power when power demand exceeds a capacity of the engine-independent power sources.

Embodiments of the vehicle power systems and methods of providing vehicle power may be used on aircraft, spacecraft, surface ships, submarines, trains, buses, trucks, cars, or other vehicles. For ease of description herein, certain systems and methods of providing and controlling vehicle power are described in the exemplary context of a large aircraft. The following descriptions, however, should not be taken as limiting the use of the following systems and methods to aircraft alone.

Figure 1:
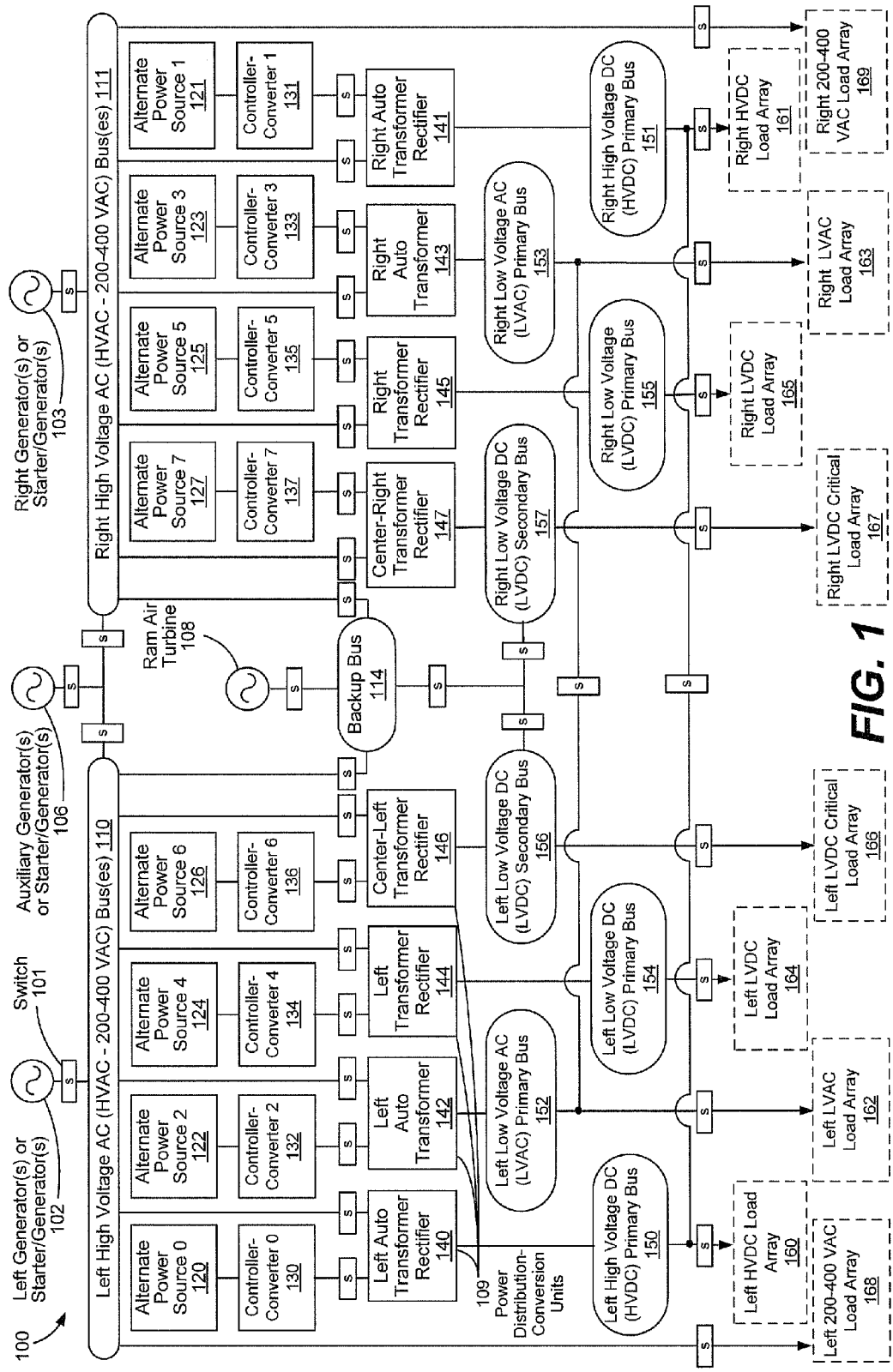
FIG. 1 is a block diagram of a first illustrative embodiment of a vehicle power system configured to enable selective coupling of starter/generators and alternate power sources (via controller-converters) to power distribution/conversion units to provide power to distribution buses to selectively provide power to various load arrays.

FIG. 1 is a block diagram of an illustrative embodiment of a vehicle power system 100. As illustrated, the vehicle power system 100 is deployed on an aircraft equipped with two engines (not shown) and each of the two engines drives a generator or starter/generator. Generators used to supply power may or may not also include starters. For the sake of simplicity in description, will be described in the text as generators even though the generators may also include starters. In an aircraft with more than two engines, there may be additional generators driven by additional engines. Also, one or more of the engines may drive more than one generator. Further, in other vehicle contexts or in non-vehicle contexts, the generators may be driven by turbines or other motivators powered by water, geothermal steam, wind, or other forces and, thus, may not be engine-driven.

In general, there may be two types of power sources used in the vehicle power system 100. The first type of power source includes engine-driven power sources, such as one or more left generators or left starter/generators 102 and one or more right generators or right starter/generators 103. The engine-driven generators 102 and 103 supply first power for the vehicle. The generator power has first power characteristics, for example, alternating current (AC) power at a high voltage between 200 and 400 volts AC (VAC). The second type of power source includes engine-independent, alternate power sources 120-127, such as fuel cell systems, batteries, recuperative actuators, supercapacitors, or other engine-independent power sources aboard the vehicle. One or more of the alternate power sources may produce power having alternate power characteristics that are different from the first power characteristics of the first power. For example, one or more of the alternate power sources may produce direct current (DC) power at a voltage level lower than that of the first power, such as AC power at a higher or lower voltage than the first power or direct current power at a high or low voltage.

For illustration, in an exemplary vehicle power system such as the vehicle power system 100, the first power may be high voltage AC power at between 200 and 400 VAC. As is further described below with respect to FIG. 5, for example, systems aboard the vehicle also may be supplied with low voltage AC (LVAC) power between 90 and 130 VAC. Systems aboard the vehicle also may be supplied with high voltage DC (HVDC) power between +/−135 VDC and +/−400 VDC or low voltage DC (LVDC) power between +/−24 to +/−100 VDC).

In addition, although the vehicle power system 100 shows single left and right buses, for example, for the HVAC buses 110 and 111, the LVAC buses 152 and 153, the HVDC buses 150 and 151, and the LVDC buses 154-157, the exemplary buses shown may signify multiple buses that carry power having the indicated power characteristics.

In the vehicle power system 100 of FIG. 1, distribution buses 150-157 may receive power from both types of sources. For example, a left HVDC primary bus 150 may receive power from an alternate power source 0 120 via controller-converter 0 130, which controls power output of the alternate power source 0 120, and via a left auto transformer rectifier 140. The left HVDC primary bus 150 may also receive power from the left generator 102 via a left HVAC bus 110 and via the left auto transformer rectifier 140. The left auto transformer rectifier 140 converts power from both the alternate power source 0 120 (received via controller-converter 0 130) and from the left generator 102 (received via the left HVAC bus 110) to power having nominal power characteristics of power carried by the left HVDC primary bus 150. Power from the left HVDC primary bus 150 is received and used by the left HVDC load array 160. The left HVDC primary bus 150 may be interconnected with a right HVDC primary bus 151 to provide redundancy or to supplement power supplied to the right HVDC primary bus 151 by other sources.

Note that the left auto transformer rectifier 140 is just one of a number of types of power distribution-conversion units 109 that may be included in the vehicle power system 100. An auto transformer rectifier, like the left auto transformer rectifier 140 may be an appropriate device to convert a quantity of first power, which may have power characteristics nominally at 200-400 VAC, from the left HVAC bus 110 to nominal +/−135 to +/−400 VDC as carried by the left HVDC primary bus 150. On the other hand, conversions from 200-400 VAC first power to other voltage levels of AC power or various levels of DC power may be more appropriately handled by another type of device. For example, an auto transformer, such as the left auto transformer 142, may be an appropriate device to convert 200-400 VAC first power to nominal 90 to 130 VAC as carried by the left LVAC primary bus 152. Similarly, a transformer rectifier, such as the left transformer rectifier 144, may be an appropriate device to convert 200-400 VAC first power to nominal +/−24 to +/−100 VDC as carried by the left LVDC primary bus 154. Thus, the power distribution-conversion units 109 may include various types of devices for converting and distributing power depending on the particular conversion that may be performed.

Also note that the controller-converters 130-137 may be selectively coupled to power distribution-conversion units 109, and the buses 110, 111, 150-157 may be selectively coupled to respective load arrays 160-169 by one or more switches or contactors. Similarly, corresponding left and right buses that carry power of the same characteristics, such as high voltage AC power, LVAC power, HVDC power, or LVDC power, may be selectively coupled with one or more switches or contactors 101 to enable selective interconnection of buses and sharing of power. The switches or contactors 101 in the vehicle power system 100 (or in other power systems) generally include electromechanical or solid-state switches.

For example, the switch 101 used to connect the left starter/generator 102 to the left HVAC bus 110 may be a solid-state switch, while the switch connecting controller-converter 6 136 to center-left transformer-rectifier may be an electromechanical switch. Only the switch 101 between the left starter/generator 102 and the left high voltage AC bus 110 is labeled with a reference number for the sake of visual simplicity in FIG. 1 (as well as in FIGS. 2 and 3). Nonetheless, switches or contactors may be deployed at various interconnections to provide configuration flexibility and device protection.

Although FIGS. 1-5 show single switches interconnecting various components, more than one switch may be used as appropriate. For example, only one switch is shown connecting the left high voltage AC bus 110 and a left 200-400 VAC load array 168. However, the left 200-400 VAC load array 168 may actually include a number of individual devices. Each of the individual devices may be coupled to the left high voltage AC bus 110 via one or more switches.

The vehicle power system 100 of FIG. 1 is described in detail, beginning with a left side of the vehicle power system 100. The vehicle power system 100 includes a left generator 102 (or starter/generator, as previously described). When the left generator 102 includes a starter/generator, the left starter/generator 102 is supplied with power to rotate the left engine (not shown) in order to start the left engine. After the left engine has been started, the left starter/generator 102 converts mechanical energy from the rotation of the left engine into electricity which may be routed to the left HVAC bus 110. If the left generator 102 is solely a generator, the left generator 102 converts mechanical energy from the rotation of the left engine into electricity which may be routed to the left HVAC bus 110. Also, as previously described, there may be multiple generators or starter/generators powered by one or more engines on each side of the aircraft. However, only a single left generator 102 is described for the sake of simplicity of description.

The left starter/generator 102 is coupled via the switch 101 to the left high voltage AC bus 110. The left HVAC bus 110 conducts first power generated by the left generator 102 to other systems. In a particular embodiment, the first power distributed via the left high voltage AC bus 110 is 200 to 400 volts alternating current (VAC). It is believed that 200 to 400 VAC is a relatively high voltage level for use as first power in many vehicles, such as large commercial aircraft.

In a particular embodiment, the switch 101 may be used to selectively couple or decouple the left generator 102 from the left high voltage AC bus 110. The switch 101 may be operated by a local controller or a global controller as described further with reference to FIG. 5. In the vehicle power system 100, as well as other embodiments of vehicle power systems described herein, switches like the switch 101 may be used to selectively couple power sources or converters to corresponding devices or buses to control the distribution of power. As previously explained, although the vehicle power system 100 includes numerous switches, only the switch 101 is labeled with a reference number.

The left high voltage AC bus 110 is coupled to a left 200-400 VAC load array 168 via a switch. Devices in the left 200-400 VAC load array 168 may receive first power directly from the left high voltage AC bus 110. The left high voltage AC bus 110 may also be selectively coupled to devices that convert the first power to power having alternate power characteristics to supplement power provided by other power sources described below. The alternate power characteristics may differ from power characteristics of the first power.

The vehicle power system 100 may also include a plurality of alternate power sources 120-127. Each of the alternate power sources 120-127 may provide power with alternate power characteristics that correspond to power demands of a particular load array 160-167. For example, an alternate power source 0 120 may include a fuel cell system, a battery, a supercapacitor, a recuperative actuator, a thermoelectric generator, another engine-independent power source, or a combination thereof. The alternate power source 0 120 may provide first alternate power via a controller-converter 0 130 to the left auto transformer rectifier 140. The left high voltage AC bus 110 may also be selectively coupled via a switch to the left auto transformer rectifier 140. The left auto transformer rectifier 140 may be coupled to a left HVDC primary bus 150. The left HVDC primary bus 150 may be selectively coupled via a switch to a left HVDC load array 160. To supplement power that may be is provided by the alternate power source 0 120, the left auto transformer rectifier 0 140 may be coupled to the left high voltage AC bus 110 via a switch. Thus, for example, when power demand at the left HVDC primary bus 150 exceeds a capacity of the alternate power source 0 120, first power may be drawn from the left high voltage AC bus 110, converted by left auto transformer rectifier 140, and provided to components of the left HVDC load array 160 via the left HVDC primary bus 150.

The other alternate power sources 121-127 may be coupled to other distribution buses that can selectively receive converted first power to met power demands. For example, the alternate power source 2 122 may be coupled via the controller-converter 2 132 to the left auto transformer 142. The left high voltage AC bus 110 may be selectively coupled to the left auto transformer 142. The left auto transformer 142 may be coupled to a left LVAC primary bus 152. The left LVAC primary bus 152 may provide power to a left LVAC load array 162. An alternate power source 4 124 may be coupled via a controller-converter 4 134 to the left transformer rectifier 144. The left HVAC bus 110 may be selectively coupled to a left transformer rectifier 144. The left transformer rectifier 144 may be coupled to a left LVDC primary bus 154 to provide power to a left LVDC load array 164. An alternate power source 6 126 may be coupled via a controller-converter 6 136 to a center-left transformer rectifier 146 and to a left LVDC secondary bus 156. The left HVAC bus 110 may be selectively coupled to the center-left transformer rectifier 146. The center-left transformer rectifier 146 is coupled to a left LVDC secondary bus 156. The left LVDC secondary bus 156 may provide power to a left LVDC critical load array 166.

In this context, critical refers to a component of the vehicle that has been deemed required in order to operate the vehicle in a safe manner. For example, a critical component may be required to be present or required to be operable by a regulatory entity, such as the Federal Aviation Administration. Thus, critical does not imply, for example, that the vehicle power system 100 is not operable without the component, but rather refers to a class of components that are required by a regulatory or other oversight agency. Accordingly, which components are mandated to be "critical" may change from time to time or from one jurisdiction to another jurisdiction. Which components are mandated to be critical may also change based on a particular use to which the vehicle is being put or based on other factors.

On a right side of the vehicle power system 100, alternate power sources, controller-converters, power distribution-conversion units, and buses may be arranged similarly to components on the left side of the vehicle power system 100 described above. For example, an alternate power source 1 121 may be coupled via a controller converter 1 131 to a right auto transformer rectifier 141. A right HVAC bus 111 may also be selectively coupled via a switch to the right auto transformer rectifier 141. The right auto transformer rectifier 141 may be coupled to a right HVDC primary bus 151, which may provide power to a right HVDC load array 161. An alternate power source 3 123 may be coupled via controller-converter 3 133 to a right auto transformer 143. The right HVAC bus 111 may also be selectively coupled to the right auto transformer 143. The right auto transformer 143 is coupled to a right LVAC primary bus 153, which may provide power to a right LVAC load array 163. An alternate power source 5 125 is coupled via a controller-converter 5 135 to a right transformer rectifier 145. The right HVAC bus 111 may also be coupled to the right transformer rectifier 145. The right transformer rectifier 145 may be coupled to a right LVDC primary bus 155, which may provide power to a right LVDC load array 165. An alternate power source 7 127 may be coupled via a controller-converter 7 137 to a center-right transformer rectifier 147. The right HVAC bus 111 may also be selectively coupled to the center-right transformer rectifier 147. The center-right transformer rectifier 147 may be coupled to a right LVDC secondary bus 157, which may provide power to a right LVDC critical load array 167.

A right starter/generator 103 may be selectively coupled via a switch to the right HVAC bus 111. The right generator (or starter/generator) 103 may operate in a similar fashion as the left generator (or starter/generator) 102. For example, when the right generator 103 includes a starter/generator 103, the right starter/generator 103 may facilitate starting a right engine and then may be driven by the right engine to produce electricity (e.g., second power or second generator power). The right HVAC bus 111 may provide power via a switch to a right 200-400 VAC load array 169. In addition, one or more auxiliary generators or starter/generators 106 may be mechanically coupled to one of the engines (not shown) to provide backup for one or more other generators or starter/generators 102 or 103. The left HVAC bus 110, the right HVAC bus 111, and the one or more auxiliary generators or starter/generators 106 may be selectively coupled together via switches to allow the one or more auxiliary generators or starter/generators to provide power to the high voltage primary buses 110 and 111.

In a particular embodiment, one or more of the available buses may be coupled to high voltage sources to operate as the HVAC buses 110, 111 (or generator distribution buses). Others of the available buses such as buses 114 and 151-157 may be coupled to alternate power sources (or power distribution-conversion units configured to convert first power to power having alternate power characteristics) such that they operate as alternate buses. Together, the high voltage primary buses 110, 111, the alternate buses 114, 151-157, and the power sources 102, 103, 106, 108, and 120-127 form a power distribution grid that enables distributing power throughout a vehicle. Buses of the power distribution grid may be selectively interconnected to provide supplemental power or back up power. For example, the left HVAC bus 110 and the right HVAC bus 111 may be selectively interconnected, and other left and right buses also may be selectively interconnected. To illustrate, the left HVDC primary bus 150 may be selectively coupled to the right HVDC primary bus 151. Thus, the left HVDC load array 160 and the right HVDC load array 161 may receive power from the left HVDC primary bus 150, the right HVDC primary bus 151, or both. Similarly, the left LVAC primary bus 152 may be selectively coupled to the right LVAC primary bus 153, the left LVDC primary bus 154 may be selectively coupled to the right LVDC primary bus 155, and the left LVDC secondary bus 156 may be selectively coupled to the right LVDC secondary bus 157.

A ram air turbine 108 may be selectively coupled via a switch to the backup bus 114. The backup bus 114 may be selectively coupled via switches to the high voltage primary buses 110 and 111 to provide backup power to the high voltage primary buses 110 and 111. The backup bus 114 may also be selectively coupled to the LVDC secondary buses.

The alternate power sources 120-127 may provide a principal source of power to each of the corresponding load arrays 160-167 via the corresponding buses 150-157. The alternate power output by the alternate power sources 120-127 may be supplemented using first power drawn from the left and right HVAC buses 110 and 111 and converted by the controller-converters 130-137. For example, a portion of the first power may be selectively converted to power having power characteristics of the power supplied by one or more of the alternate power sources 120-127 to supplement the power provided by the alternate power sources 120-127 in response to power demand at one of more of the load arrays 160-167. Further, by selectively cross-coupling corresponding left and right buses 110, 111, and 150-157, power output of each of the buses 110, 111, 150-157 may be supplemented by power available on corresponding buses on an opposing side of the vehicle power system 100. Backup or supplementary power also may be provided to either or both sides of the vehicle power system 100 by the auxiliary starter/generator 106 and by the ram air turbine 108 via the backup bus 114.

In a particular embodiment, the alternate power sources 120-127 and the controller-converters 130-137 may be directly coupled to the power distribution-conversion units 140-147, as described with reference to FIG. 1. In another particular embodiment, the alternate power sources 120-127 and the controller-converters 130-137 may be directly coupled to the power distribution buses 150-157, as described with reference to FIG. 2. In another particular embodiment, the alternate power sources 120-127 and the controller-converters 130-137 may be directly coupled to the load arrays 160-167, as described with reference to FIG. 4. Particular embodiments are not limited as to positions of the power distribution-conversion units 109, the alternate power sources 120-127, and the controller-converters 130-137 relative to positions of the load arrays 160-169. Particular arrangements of components of the power distribution grid may provide operational or manufacturing cost savings. For example, vehicle weight due to wiring may be reduced by positioning a particular one or more of the alternate power sources 120-127 near a load that uses power from a particular alternate power source.

Figure 2:
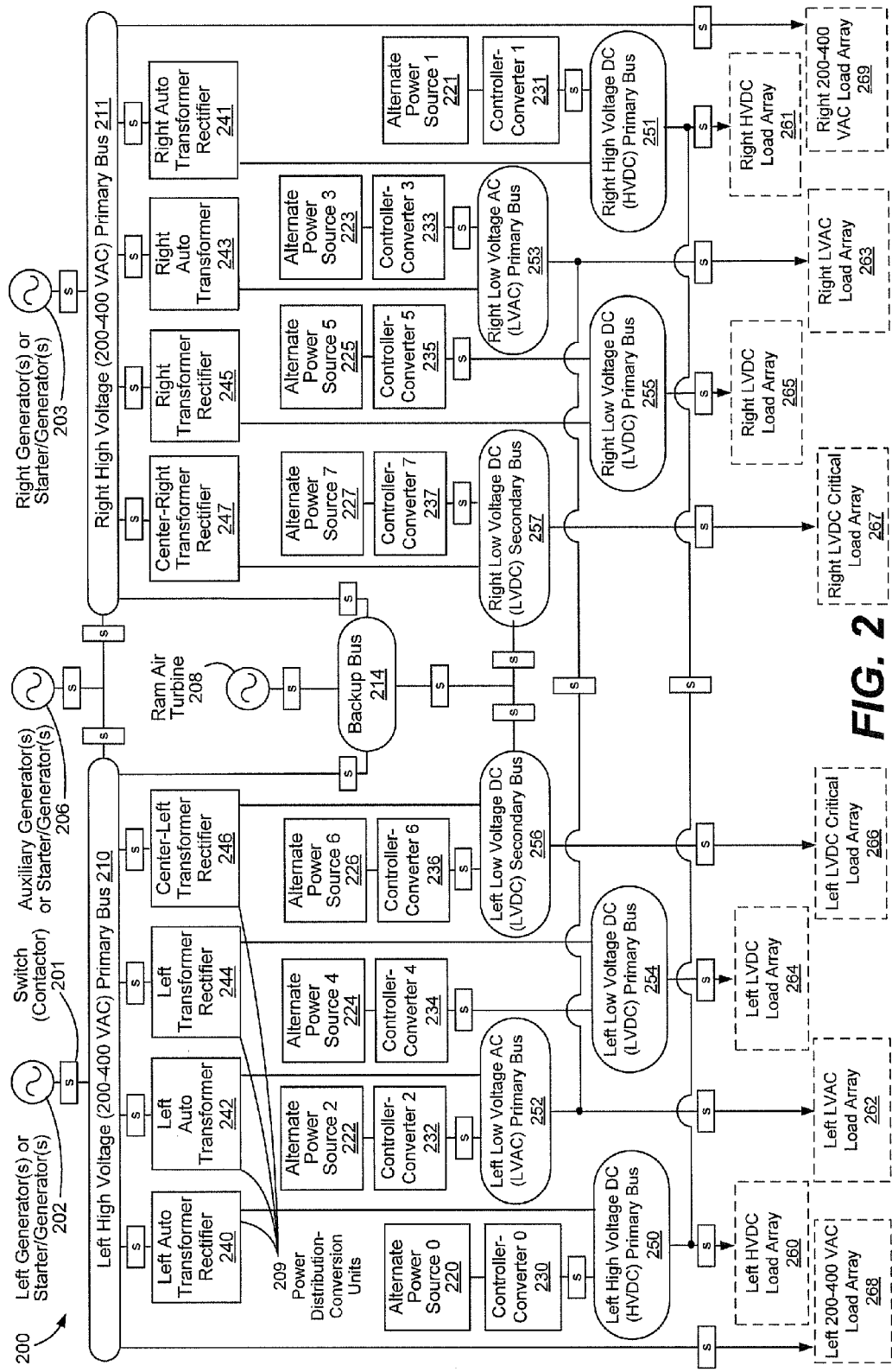
FIG. 2 is a block diagram of a second illustrative embodiment of a vehicle power system configured to enable selective coupling of power distribution/conversion units receiving power from starter/generators and alternate power sources (via controller-converters) to distribution buses to selectively provide power to various load arrays.

FIG. 2 is a block diagram of a second illustrative embodiment of a vehicle power system 200. In the vehicle power system 200, each device corresponds to one of the devices in the vehicle power system 100 except that locations and interconnections of some of the device have been changed in vehicle power system 200 relative to the vehicle power system 100. Thus, each device of the vehicle power system 200 performs the same function as was described for the corresponding device shown in the vehicle power system 100 of FIG. 1. In contrast to the vehicle power system 100 of FIG. 1, in the vehicle power system 200 of FIG. 2, alternate power sources 220-227 may be coupled via associated controller-converters 230-237 directly to buses 250-257. By contrast, in FIG. 1, the alternate power sources 120-127 are coupled via associated controller-converters 130-137 to power distribution units 109 which, in turn, are coupled to the buses 150-157. As in FIG. 1, the high voltage primary buses 210 and 211 are coupled via the power distribution-conversion units 209 to the buses 250-257. Coupling the alternate power sources 220-227 via the controller-converters 230-237 may facilitate conditioning of local load demand without changing the demands, fuel consumption, or other operating conditions of large-capacity engine-driven generators 202 and 203.

In addition to facilitating conditioning of local load demand, coupling the alternate power sources 220-227 and the associated controller-converters 230-237 to the power distribution buses 250-257 directly (as in FIG. 2) or via the power distribution-conversion units 209 (as in FIG. 1) may facilitate the use of different component placement and wiring configurations. The different component and wiring configurations may yield additional benefits. For example, in the vehicle power system 200, power distribution-conversion units 209 of the vehicle power system 200 are shown as being located close to the left HVAC bus 210 and the right HVAC bus 211. The alternate power sources 220-227 and the controller-converters 230-237 are located closer to load arrays 260-267 to which each provides power. Positioning the alternate power sources 220-227 and the controller-converters 230-237 closer to their respective load arrays 260-267 may reduce a length of the respective buses 250-257 used to carry power to the load arrays 260-267.

Positioning the alternate power sources 220-227 and the controller-converters 230-237 closer to their respective load arrays 260-267 may thus reduce a quantity of wire used in the buses 250-257. Reducing the quantity of wire used in the numerous buses 250-257 may reduce the cost of manufacturing the vehicle. Reducing the quantity of wire used in the buses 250-257 may also reduce an overall weight of the vehicle and also the power losses, which may result in greater fuel efficiency and reduced emissions. Positioning the alternate power sources 220-227 and the controller-converters 230-237 closer to their respective load arrays 260-267 also may contribute to a modular implementation of devices in the vehicle power system 200 that may simplify installation and maintenance activities.

However, as previously explained with reference to FIG. 1, embodiments of a vehicle power system are not limited as to relative placement of the power distribution-conversion units 209, alternate power sources 220-227, controller-converters 230-237, and loads 260-269. Relative placement of the components may be made for the sake of cost savings, ease of installation or maintenance, or other factors.

Figure 3:
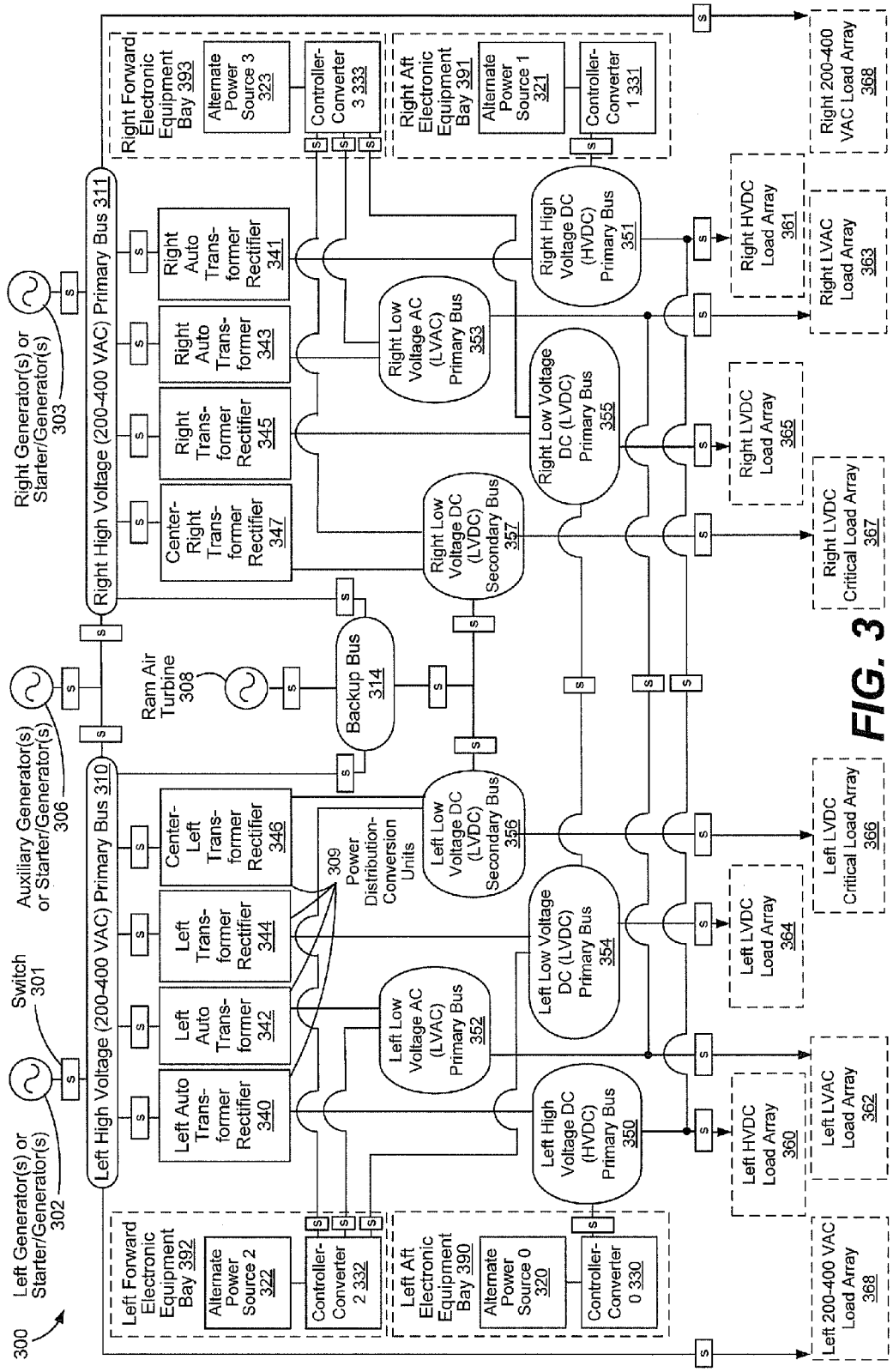
FIG. 3 is a block diagram of the vehicle power system of FIG. 2 in which the alternate power sources are positioned in electronic equipment bays as may be used on a vehicle.

FIG. 3 is a block diagram of a third illustrative embodiment of a vehicle power system 300. Devices in the vehicle power system 300 that correspond to devices in the vehicle power system 300 may perform the same functions that were described above.

The particular illustrative embodiment of the vehicle power system 300 shows alternate power sources 320-323 and controller-converters 330-333 installed in forward and aft electronic equipment bays 390-393. Although not shown in FIG. 3, other corresponding components, including the corresponding power distribution/control units 309 and the corresponding buses 350-357 also may be installed in the equipment bays 390-393. Equipment providing or using different types of power may be divided into different electronic equipment bays, left or right, forward or aft. Although FIG. 3 depicts one forward equipment bay on each side of the vehicle and one aft equipment bay on each side of the vehicle, it should be understood that the number and placement of the equipment bays is only for illustration. There may be multiple forward or multiple aft equipment bays on one or both sides of the aircraft. Alternatively, there may only be one or more equipment bays on one side of the vehicle or only at a forward or aft end of the vehicle on one or more sides.

In exemplary vehicle power system 300 of FIG. 3, the left aft electronic equipment bay 390 may accommodate alternate power source 0 320 and controller converter 0 330, as shown in FIG. 3. Although not shown in FIG. 3, corresponding equipment such as a left HVDC primary bus 350 and a left auto transformer rectifier 340 may also be deployed in the left aft electronic equipment bay 390. Equipment in the left aft electronic equipment bay 390 may provide power via a left HVDC primary bus 350 to a left HVDC load array 360. Thus, high-voltage DC equipment may be grouped in the left aft electronic equipment bay 390.

On the other hand, lower voltage equipment may be housed in the left forward electronic equipment bay 392. The left forward electronic equipment bay 392 may receive alternate power source 2 322 and controller converter 2 332. Although not shown in FIG. 3, the left forward electronic equipment bay 392 also may receive a left LVAC primary bus 352 and an associated left auto transformer 342 (that may be used to draw power from a left HVAC bus 310 to supplement the power available at the left LVAC primary bus 352) that provides power to a left LVAC load array 362. The left forward electronic equipment bay 392 also may receive a left LVDC primary bus 354 VAC primary bus 352 and an associated left transformer rectifier 344 (that may be used to draw power from the left HVAC bus 310 to supplement the power available at the left LVDC primary bus 354) that provides power to the left LVDC load array 364. Similarly, a center-left transformer rectifier 346 and a left LVDC secondary bus 356 may be received in the left forward electronic equipment bay 392. Similar arrangements of equipment may be made in the right aft electronic equipment bay 391 and the right forward electronic equipment bay 393.

Installing some or all of the alternate power sources 320-323, controller-converters 330-333, power distribution units 309, and buses 350-357 in the equipment bays 390-393 may enhance access to the alternate power sources 320-323, power distribution-conversion units 309, and buses 350-357. The enhanced access enables ease of installation and maintenance, and may reduce wiring requirements. However, embodiments of the vehicle power system 300 do not limit placement of the alternate power sources 320-323, power distribution-conversion units 309, and other devices.

The alternate power source 0 320 and the controller-converter 0 330 may provide power to the left HVDC load array 360. Similarly, the alternate power source 1 321 and the controller-converter 1 331 may provide power to the right HVDC load array 361. However, in the vehicle power system 300, some of the alternate power sources and controller-converters to may provide power to multiple load arrays. For example, the alternate power source 2 322 and the controller-converter 2 332 may provide power to each of the left LVAC primary bus 352, the left LVDC primary bus 354, and the left LVDC secondary bus 356. Similarly, the alternate power source 1 321 and the controller-converter 1 331 may supply the right HVDC primary bus 351, and the alternate power source 3 323 and the controller-converter 3 333 may supply each of the right LVAC primary bus 353, the right LVDC primary bus 355, and the right LVDC secondary bus 357.

Multi-function controller-converters, such as the controller-converter 2 332 and the controller-converter 3 333, that provide multiple power types (i.e., power having different power characteristics) may reduce a number of controller-converters and a number of alternate power sources to be carried aboard the vehicle. Thus, when anticipated demand for a particular type of power may be met by a single alternate power source and a multi-function controller-converter, additional manufacturing or operational costs may be saved. For example, material costs, installation costs, maintenance costs, and weight may be saved.

The vehicle power system 300 also includes electronic equipment bays 390-393. The alternate power sources 320-323 and the controller-converters 330-333 may be deployed in a particular electronic equipment bay 390-393 may be based on the associated power distribution-conversion units 309 and the associated buses 350-357 being located in or near the same equipment bay. For example, the alternate power source 0 320 and the controller-converter 0 330 may be deployed in a left aft electronic equipment bay 390. The left aft electronic equipment bay 390 may be close to the left HVDC load array 360 to reduce wiring complexity and weight. The left aft electronic equipment bay 390 also may be close to the left auto transformer rectifier 340 and the left HVDC primary bus 350.

Similarly, the alternate power source 1 321 and the controller-converter 3 331 may be deployed in a right aft electronic equipment bay 392, which may be close to the right LVAC load array 362. The alternate power source 2 322 and the controller-converter 2 332 may be deployed in a left forward electronic equipment bay 392, which may be close to the left LVAC load array 362, the left LVDC load array 364, and the left LVDC secondary load array 366. The alternate power source 3 323 and the controller-converter 3 333 may be deployed in a right forward electronic equipment bay 393, which may be close to the right LVAC load array 363, the right LVDC load array 365, and the right LVDC critical load array 367. Locating equipment in the electronic equipment bays 390-393 may simplify maintenance and installation. Further, when the electronic equipment bays 390-393 are located near loads that use power from the alternate power sources 320-323 reduced lengths of the corresponding buses 352, 354, and 356 may be used. Reducing the length of the buses 352, 354, and 356 may simplify installation and maintenance as well as reduce wiring complexity and weight of the vehicle.

Figure 4:
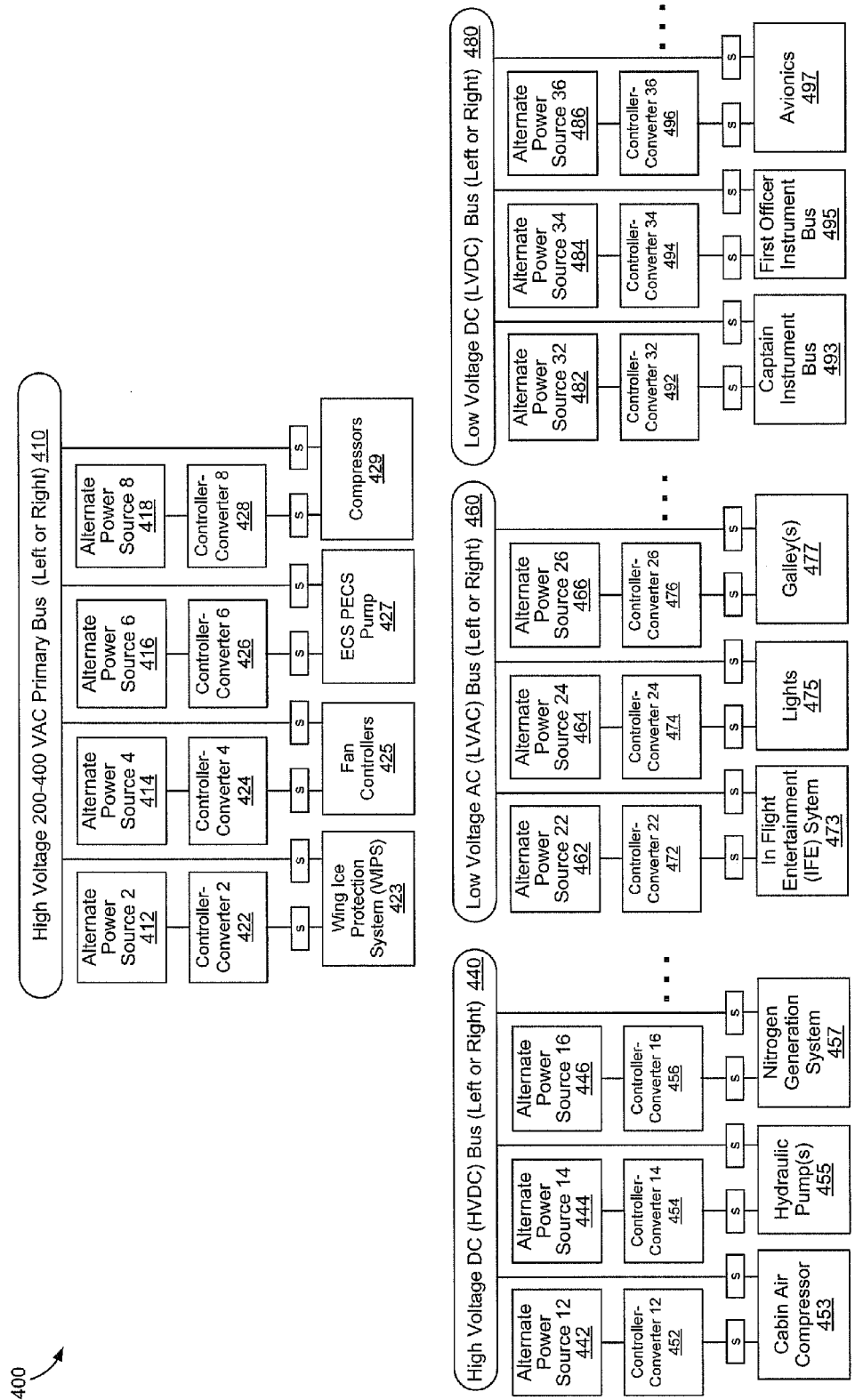
FIG. 4 is a block diagram of a third illustrative embodiment of a vehicle power system configured to enable selective coupling of power distribution buses and alternate power sources (via controller converters) to individual subsystems.

FIG. 4 is a block diagram of a particular illustrative embodiment of vehicle power system 400. The vehicle power system 400 includes particular subsystems that are powered by separate power sources and converters. In the vehicle power systems 100, 200, and 300 of FIGS. 1-3, alternate power sources may be used to supply power to a group of loads in a load array, where loads in a load array uses the same power type (i.e., power with the same power characteristics). In the embodiment illustrated in FIG. 4, separate power supplies are provided for one or more individual devices or subsystems rather than providing a power supply for each power type. For example, some or all of the individual devices or loads may have dedicated alternate power sources and controller-converters. Note that, although the distribution buses 410, 440, 460, and 480 are shown as being independent buses in FIG. 4, the distribution buses 410, 440, 460, and 480 may be interconnected as described with reference to FIGS. 1-3.

For example, the vehicle power system 400 may selectively provide power to a wing ice protection system (WIPS) 423, fan controllers 425, an environmental control system (ECS) power electronics cooling system (PECS) pump 427, and one or more compressors 429 via a high voltage bus 410. The WIPS 423 may be powered by an alternate power source 2 412 via a controller-converter 2 422. A portion of the first power from the high voltage bus 410 may be converted to power having alternate power characteristics like the power supplied by the alternate power source 2 412 to supplement alternate power from the alternate power source 2 412 responsive to demand of the WIPS 423. The fan controllers 425 may be powered by an alternate power source 4 414 via a controller-converter 4 424. First power from the high voltage bus 410 may be converted to power having alternate power characteristics of the alternate power provide by alternate power source 4 414 to supplement alternate power from the alternate power source 4 414 responsive to demand of the fan controllers 425. The ECS PECS pump 427 may be powered by an alternate power source 6 416 via a controller-converter 6 426. An additional portion of the first power from the high voltage bus 410 may be converted to power having the power characteristics of the alternate power source 6 416 to supplement alternate power from the alternate power source 6 416 responsive to demand from the environmental control system pump 427. The one or more compressors 429 may include a forward cargo air conditioning (FCAC) compressor and an integrated cooling system (ICS) compressor, which may be associated with one or more ECS recirculation fans (not shown). The one or more compressors may be may be powered by an alternate power source 8 418 via a controller-converter 8 428. A portion of the first power from the high voltage bus 410 may be converted to power having the power characteristics of the alternate power supplied by the alternate power source 8 418 responsive to demand from the one or more compressors 429.

The vehicle power system 400 may also provide power to a cabin air compressor (CAC) 453, one or more hydraulic pumps 455, and a nitrogen generation system (NGS) 457 that each operate using nominal HVDC power. In the vehicle power system 400, the CAC 453 may be powered by an alternate power source 32 442 via a controller-converter 32 452, supplemented responsive to demand by an HVDC bus 440. The one or more hydraulic pumps 455 may be powered by an alternate power source 34 444 and a controller-converter 34 454, supplemented responsive to demand by the HVDC bus 440. The nitrogen generation system 457 may be powered by an alternate power source 16 446 via a controller-converter 16 456, supplemented responsive to demand by the HVDC bus 440.

The vehicle power system 400 may also provide power to an in-flight entertainment (IFE) system (IFE) 473, lights (including an interior lighting system) 475, and one or more galleys 477 that each operate using nominal LVAC power. In the vehicle power system 400, the IFE system 473 may be powered by an alternate power source 22 462 via a controller-converter 22 472, supplemented responsive to demand by an LVAC bus 460. The lights 475 may be powered by an alternate power source 24 464 via a controller-converter 24 474, supplemented responsive to demand by the LVAC bus 460. The galleys 477 may be powered by an alternate power source 26 466 via a controller-converter 26 476, supplemented responsive to demand by the LVAC bus 460.

The vehicle power system 400 may also provide power to a captain's instrument bus 493, a first officer instrument bus 495, and avionics 497 that each may operate using nominal LVDC power. In the vehicle power system 400, the captain's instrument bus 493 may be powered by an alternate power source 32 482 via a controller-converter 32 492, supplemented responsive to demand by an LVDC bus 480. The first officer's instrument bus 495 may be powered by an alternate power source 34 484 via a controller-converter 34 494, supplemented responsive to demand by the LVDC bus 480. The avionics 497 may be powered by an alternate power source 36 486 via a controller-converter 36 496, supplemented responsive to demand by the LVDC bus 480.

In a particular embodiment, certain subsystems have a dedicated alternate power source and other subsystems share one or more alternate power sources. For example, one of the HVDC devices, such as the hydraulics system 455, may have its own alternate power source while other devices operating using HVDC power may share an alternate power source and controller-converter. The relative cost, complexity, priority, and other criteria associated with individual subsystems or groups of subsystems may be compared to determine whether individual devices or groups of devices are to be associated with dedicated power sources.

Figure 5:
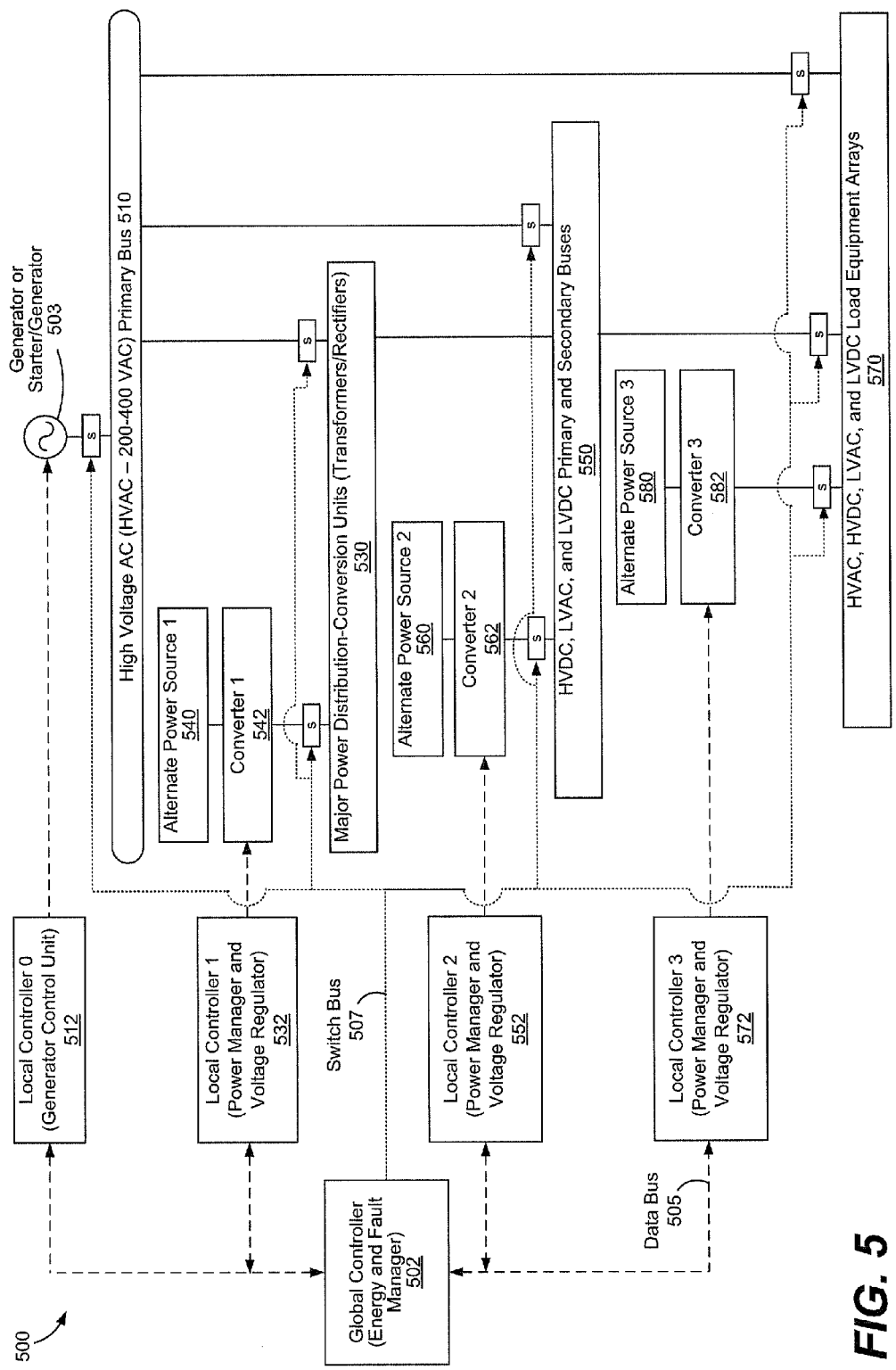
FIG. 5 is a block diagram of an illustrative embodiment of a control system depicting a global controller and a plurality of local controllers used to control operation of advanced power sources and converters in a vehicle.

FIG. 5 is a block diagram of a control system 500 for controlling a plurality of vehicle power sources. The control system 500 includes a global controller 502 and a plurality of local controllers 512, 532, 552, and 572 that are used to control operation of alternate power sources and converters in a vehicle. The global controller 502 may act as an energy and fault manager for the vehicle. For example, the global controller 502 may monitor power availability and demand throughout the vehicle based on reports from local controllers 512, 532, 552, and 572 via a data bus 505. In response to the reports, the global controller 502 may send control signals via a switch bus 507 that cause power to be selectively distributed according to a control algorithm. For example, the control signals may cause sources or loads to be added to a distribution bus. In addition, the global controller 502 may also communicate with the local controllers 532, 552, and 572 in communication with converters 542, 562, and 582, respectively, regarding a process employed by the converters 542, 562, and 582 in performing power conversion. In one particular embodiment, the global controller 502 evaluates system power availability and performs appropriate scheduling and other energy distribution control, for example, to optimize the distribution and consumption of energy.

The control system 500 may include one or more alternate power sources 540, 560, and 580 that may be selectively controlled by local power controllers 532, 552, and 572, respectively, via converters 542, 562, and 582, respectively. The power provided by the alternate power sources 540, 560, and 580 may supplement a supply of first power provided by an engine-driven power source, such as a generator 503. Alternatively, the first power may be used to supplement power provided by the alternate power sources 540, 560, and 580. The generator 503 may selectively (e.g., via switches) provide power to major power distribution-conversion units 530 (e.g., transformers, rectifiers, or other power conversion devices) and the one or more buses to provide power to HVDC, LVAC, and LVDC load arrays, as previously described with reference to FIGS. 1-4.

In a particular embodiment, local controller 0 512, which is a generator control unit 512, communicates with the generator or starter/generator 503. A system that includes multiple generators may include at least one local controller in the form of a generator control unit for each of the generators. Via the local controller 0 and generator control unit 512 and the data bus 505, the global controller 502 monitors power that may be available from the generator 503. A local controller 1 532 is a power manager and voltage regulator that may communicate with a converter 1 542 to determine power availability from an alternate power source 1 540. Information regarding power availability or capability of the alternate power source 1 540 may be provided to the global controller 502 by the local controller 1 532. Similarly, information regarding power availability or capability of an alternate power source 2 560 may be provided to the global controller 502 by a local controller 2 552, and information regarding power availability or capability of an alternate power source 3 580 may be provided to the global controller 502 by a local controller 3 572. As is the case with the local controller 3 572, the local controller 1 532 and the local controller 2 552 may include a power manager and voltage regulator that operates with respective converters 542 and 562 to control output of alternate power sources 540 and 560, respectively.

The global controller 502 can determine an efficient allocation of power throughout the vehicle based on information regarding the capabilities and availability of each of the power sources aboard the vehicle, including the generator 503 and the alternate power sources 540, 560, and 580. The global controller 502 may employ various methods of controlling allocation of power, for example, to optimize energy distribution and consumption. For example, power may be allocated using information regarding power availability and demand communicated between the global controller 502 and the local controllers 512, 532, 552, and 572. The allocation of power may be made according to a control algorithm implemented by the global controller 502. The control algorithm may include scheduling, dynamic scheduling, load shedding, linearization optimization, or other algorithms to control power distribution to optimize energy distribution and consumption.

When each of the alternate power sources 540, 560, and 580 is able to fully supply the corresponding buses 550 and 570 (and the loads drawing from the buses, not shown in FIG. 5), the global controller 502 may use the switch bus 507 to decouple the generator 503 from the buses 510, 550, and 570 to reduce the burden on the generator 503. Reducing the burden on the generator 503 may reduce fuel consumption and emissions of the vehicle. As another example, when one of the local controllers 512, 532, 552, and 572 indicates that one of the buses or arrays 510, 550, and 570 has unmet power demand, the global controller 502 may selectively couple the generator 503 and the high voltage primary bus 510 to the bus or buses with unmet power demand.

Alternatively, when the global controller 502 determines from the local controllers 512, 532, 552, and 572 that power output of the generator 503 is sufficient to supply a power demand of some or all of the buses or arrays 510, 550, and 570, the global controller 502 may direct the local controllers 532, 552, and 572 and the converters 542, 562, and 582 to stop drawing from the associated alternate power sources 540, 560, and 580. The global controller 502 thus may preserve capacity or availability of the alternate power sources 540, 560, 580 for another phase of operation.

Figure 6:
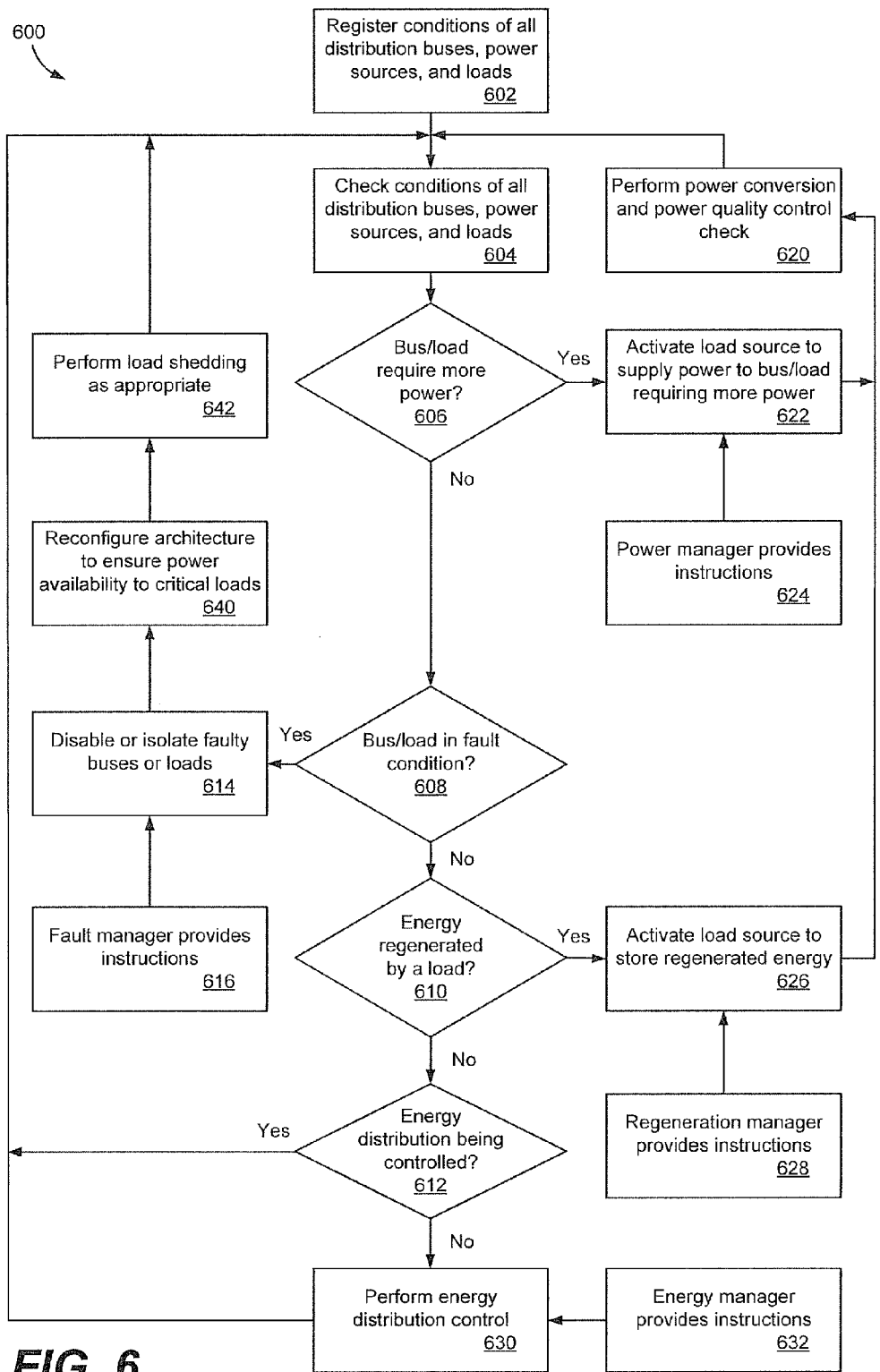
FIG. 6 is a flow diagram of a particular embodiment of a method of controlling vehicle power sources.

FIG. 6 is a flow diagram of a particular embodiment of a method 600 of controlling vehicle power sources. For example, the method 600 may use a control system such as the control system 500 of FIG. 5 to monitor power demand for various loads or buses and to monitor power capability of generators or other power sources to manage power distribution for a vehicle.

Conditions of distribution buses, power sources, and loads may be registered, at 602. For example, the conditions may be registered by a global controller in communication with one or more local controllers, such as the global controller 502 and the local controllers 512, 532, 552, and 572 of FIG. 5. The conditions of the distribution buses, power sources, and loads may be checked, at 604, to adjust for changes throughout the course of an operation. As previously described with reference to FIGS. 1-4, the power sources may include engine power provided by the starter generators and alternate power from a plurality of alternate power sources that, along with power distribution-conversion units, controller-converters, and distribution buses, may be interconnected in various ways. The alternate power sources may include one or more fuel cell systems, batteries, supercapacitors, thermoelectric generators, and other types of engine-independent power sources. A determination is made, at 606, whether more power is required (e.g., based on power demand) for one or more buses or loads. When it is determined that more power is required, a power manager may provide instructions, at 624, that cause a load source to be activated, at 622, to supply power to a bus or load requiring more power. Power conversion and power quality control checks may be performed, at 620, to ensure that adequate power is provided and that the power meets quality requirements.

When it is determined that no buses or loads require more power, a determination may be made whether any buses or loads are in a fault condition, at 608. It is possible that, if power is not required by a bus or a load, that the bus or the load has failed. When it is determined that a bus or load is in a fault condition, a fault manager may provide instructions, at 616, that cause the faulty buses or loads to be disabled, at 614. A power distribution architecture may be reconfigured to ensure power availability to critical loads, such as avionics and flight crew instruments, at 640. Based on the fault condition determined, loads may be shed to meet critical load demands, at 642.

When no bus or load is determined to be in a fault condition, a determination may be made whether energy is being regenerated by a load, at 610. For example, a control surface of an aircraft may be able to generate electrical power from air pressure applied to a control surface, such as a flap or rudder, using a recuperative actuator. In yet another example, vibration energy may be stored or captured from a pre-determined vibrational source, e.g., wheel, strut, fuselage, or other load source. When energy is being regenerated by a load, a load source may be activated to store or use the regenerated energy, at 626. Power conversion and power quality control checks are performed, at 620, to ensure that adequate power is provided.

When energy is not being regenerated by a load, a determination may be made whether energy distribution is already being controlled to enable enhanced energy management, at 612. Energy distribution controlled to enable enhanced energy management may result from efficiently using energy by, for example, reducing dependence on engine-driven generators when alternate power sources supply sufficient power for buses or loads. When energy distribution already is being controlled to enable enhanced energy management, ongoing checking of conditions of distribution buses, power sources, and loads continues to be performed, at 604. When energy distribution control to enable enhanced energy management is not already being performed, an energy manager may provide instructions, at 632, that cause energy distribution control to be performed, at 630.

Figure 7:
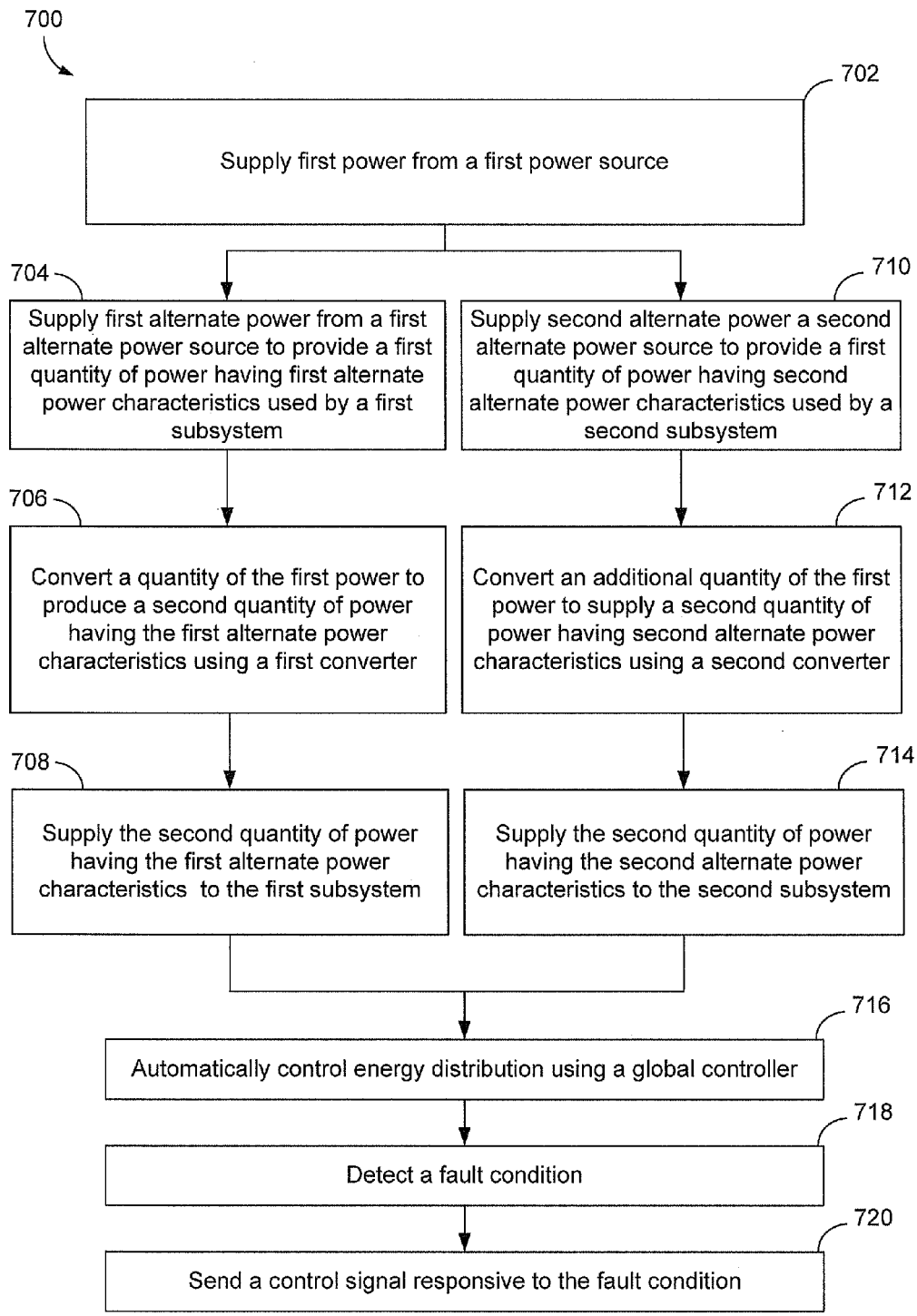
FIG. 7 is a flow diagram of a particular embodiment of a method of providing power to a vehicle subsystem.

FIG. 7 is a flow diagram of a particular embodiment of a method 700 of providing power to a subsystem, such as a vehicle subsystem. The method 700 may include supplying first power from a first source, at 702. The first power source may include an engine-driven generator on a vehicle or another power source. The first power may be supplied via a first distribution bus. For example, the first power may be generated by one of the starter/generators 102, 103, 202, 203, 302, and 303 of FIGS. 1-3 or the generator 503 of FIG. 5. The first distribution bus may include one of the HVAC buses 110, 111, 210, 211, 310, and 311 of FIGS. 1-3, the HVAC bus 410 of FIG. 4, or the HVAC bus 510 of FIG. 5.

The method 700 may also include supplying first alternate power from a first alternate power source to provide a first quantity of power having first alternate power characteristics used by a first subsystem, at 704. The first alternate power source may be a power source independent of the first power source, such as a battery or fuel cell that operates independently of a generator that may be the source of the first power. In a particular embodiment, the first alternate power source is one of the alternate power sources 320-127 of FIGS. 1-3, one of the alternate power sources 412-418, 442-446, 462-466,

482-486 of FIG. 4, or the alternate power sources 540, 560, 580 of FIG. 5. The first alternate power may have different power characteristics from the first power. For example, the first power may be alternating current and the first alternate power may be direct current. In another example, the first power may be relatively high voltage and the alternate power may be lower voltage. For illustration, the first alternate power may be high voltage DC power supplied by alternate power source 0 220 via controller-converter 0 230 to the left HVDC load array 260 via the left HVDC primary bus 250. The first subsystem may include a first vehicle subsystem, such as one of the vehicle subsystems described with reference to FIG. 5.

In a particular embodiment, the first portion of the first alternate power may be supplied at a location that is proximate the first subsystem. For example, the engine-independent power source may be located relatively near to the first subsystem and the first power source may be located relatively far from the first subsystem. That is, the first alternate power source may be located closer to the first distribution bus than the first power source is to the first distribution bus.

A quantity of the first power may be converted by a first converter to a second quantity of power having the first alternate power characteristics, at 706. For example, referring to FIG. 2, the left auto transformer rectifier 240 may convert a portion of the first power carried by the left HVAC bus 210 to high voltage DC power used by the left HVDC load array 260. The second quantity of power having the first alternate power characteristics may be supplied to the first vehicle subsystem, at 708. Using the same example of supplying the left HVDC load array 260, the power converted by the left auto transformer rectifier 240 is supplied to the left HVDC primary bus 250.

The method 700 may also include supplying second alternate power from an a second alternate power source to provide a first quantity of power having second alternate power characteristics used by a second subsystem, at 710. In a particular embodiment, the engine-independent power source is one of the alternate power sources 320-127 of FIGS. 1-3, one of the alternate power sources 412-418, 442-446, 462-466, 482-486 of FIG. 4, or the alternate power sources 540, 560, 580 of FIG. 5. The second alternate power may have different power characteristics from the first power and from the first alternate power. For illustration, the second alternate power may be low voltage DC power supplied by alternate power source 4 224 via controller-converter 4 234 to the left LVDC load array 264 via the left LVDC primary bus 254.

An additional quantity of the first power may be converted by a second converter to a second quantity of power having the second alternate power characteristics, at 712. For example, referring to FIG. 2, the left transformer rectifier 244 may convert a portion of the generator power carried by the left HVAC bus 210 to low voltage DC power used by the left LVDC load array 264. The second quantity of power having the second alternate power characteristics is supplied to the second vehicle subsystem, at 714. Using the same example of supplying the left LVDC load array 264, the power converted by the left transformer rectifier 244 is supplied to the left LVDC primary bus 254.

The method 700 may also include automatically controlling energy distribution using a global controller, at 716. For example, when power demand at the first subsystem is high, more power may be supplied to the first subsystem via a first distribution bus from the first power source, such as an engine-driven generator or other generator, as previously described. In another example, when power demand at the first subsystem is low, less power may be supplied to the first subsystem from the first power source or from the one or more alternate power sources.

The method 700 may include detecting a fault condition, at 718. The fault condition may be detected at one or more of the power sources, at one or more of the distribution buses, or at one or more of the subsystems. A control signal responsive to the fault condition may be sent, at 720. For example, the global controller 502 of FIG. 5 may act as an energy and fault manager. The global controller 502 may reconfigure power distribution in the system 500 responsive to determining that a source or load on one of the buses 510, 550, 570 is in a fault condition. To illustrate, the global controller 502 may send control signals to switches via the switch bus 507 to reconfigure the power distribution.

Figure 8:
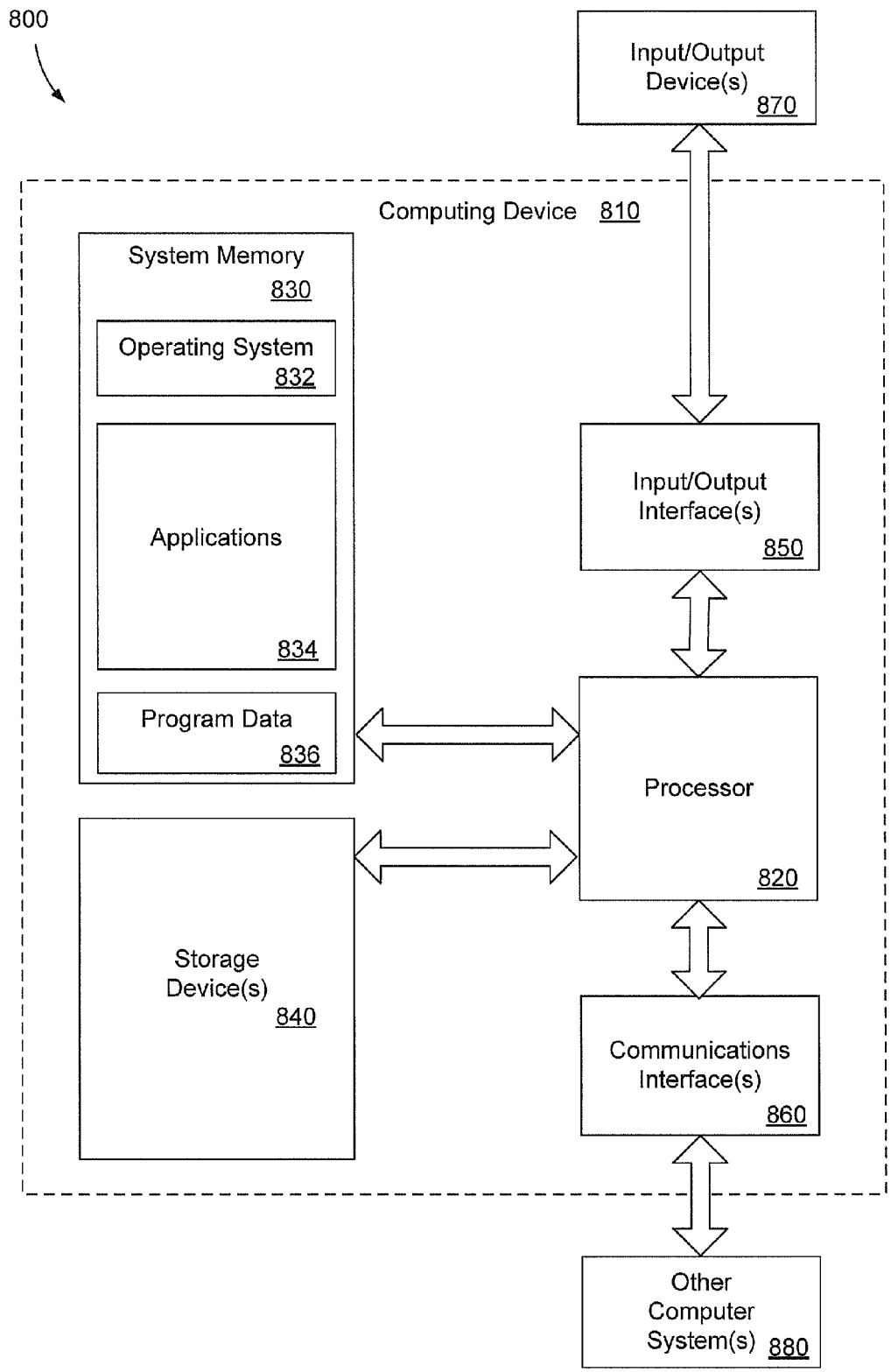
FIG. 8 is a block diagram of a general purpose computer system operable to perform computer-implemented methods or process computer-executable instructions according to a particular embodiment.

FIG. 8 is a block diagram of a general purpose computer system 800 operable to perform computer-implemented methods or process computer-executable instructions of an embodiment of methods of providing power to vehicle systems or of controlling vehicle power sources. The computer system 800 may be positioned aboard a vehicle, such as an aircraft. In an illustrative embodiment, a computing device 810 of the computing system 800 may include at least one processor 820. The processor 820 may be configured to execute instructions to implement a method of distributing vehicle power as described with reference to FIGS. 1-7. The processor 820 may communicate with a system memory 830, one or more storage devices 840, and one or more input devices 870, via input/output interfaces 850.

The system memory 830 may include volatile memory devices, such as random access memory (RAM) devices, and nonvolatile memory devices, such as read-only memory (ROM), programmable read-only memory, and flash memory. The system memory 830 may include an operating system 832, which may include a basic/input output system for booting the computing device 810 as well as a full operating system to enable the computing device 810 to interact with users, other programs, and other devices. The system memory 830 may also include one or more application programs 834, such as instructions for configuring the computing device 810 to distribute vehicle power, as previously described.

The processor 820 also may communicate with one or more storage devices 840. The storage devices 840 may include nonvolatile storage devices, such as magnetic disks, optical disks, or flash memory devices. In an alternative embodiment, the storage devices 840 may be configured to store the operating system 832, the applications 834, the program data 836, or any combination thereof. The processor 820 may communicate with the one or more communication interfaces 860 to enable the computing device 810 to communicate with other computing systems 880.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A vehicle comprising:
    a power distribution grid comprising a plurality of power sources and a plurality of distribution buses configured to distribute power from the plurality of power sources, wherein the plurality of power sources include:
        an engine-driven power source configured to provide first power, the first power having first power characteristics;
        a plurality of engine-independent power sources including:
            a first alternate power source configured to provide first alternate power, the first alternate power having first alternate power characteristics that are different than the first power characteristics; and
            a second alternate power source configured to provide second alternate power, the second alternate power having second alternate power characteristics that are different from the first power characteristics and different from the first alternate power characteristics; and
    a global controller that sends power control signals to control first total output power of the first alternate power source, second total output power of the second alternate power source, and a third total output power of the engine-driven power source supplied to the plurality of distribution buses responsive to demand on the power distribution grid.

2. The vehicle of claim 1, wherein, in response to a first increase in a first demand at a first distribution bus of the plurality of distribution buses, the global controller sends a first control signal to a first local controller of the first alternate power source, wherein the first control signal causes the first local controller to adjust the first total output power of the first alternate power.

3. The vehicle of claim 2, wherein, in response to a second increase in a second demand at a second distribution bus of the plurality of distribution buses, the global controller sends a second control signal to a second local controller of the second alternate power source, wherein the second control signal causes the second local controller to adjust the second total output power of the second alternate power.

4. The vehicle of claim 2, further comprising a first converter coupled between the first alternate power source and the first bus distribution bus, wherein the first converter is configured to adjust the first total output power supplied by the first alternate power source to the first distribution bus, and wherein the first converter adjusts the first total output power based on the first control signal received by the first local controller.

5. The vehicle of claim 4, wherein the third total output power supplied by the engine-driven power source is supplied to the first distribution bus via a second distribution bus of the plurality of distribution buses, and further comprising a first power distribution-conversion unit configured to receive a first portion of the first power via the second distribution bus and to convert a first quantity of the first power having the first power characteristics to first supplemental power having the first alternate power characteristics.

6. The vehicle of claim 5, wherein the first converter is coupled directly to the first power distribution-conversion unit and the first power distribution-conversion unit is coupled directly to the first distribution bus.

7. The vehicle of claim 5, wherein the first converter and the first power distribution-conversion unit are coupled directly to the first distribution bus.

8. The vehicle of claim 5, further comprising a second power distribution-conversion unit configured to receive a a second portion of the first power via the second distribution bus and to convert a second quantity of the first power having the first power characteristics to second supplemental power having the second alternate power characteristics.

9. The vehicle of claim 4, further comprising a load array coupled to the first distribution bus, wherein a third alternate power source is configured to provide a fourth total output power of third alternate power to the load array, the third alternate power having the first alternate power characteristics, wherein the third alternate power source is coupled to the load array via a second converter, the second converter coupled directly to the load array and to the third alternate power source.

10. The vehicle of claim 1, wherein the plurality of engine-independent power sources includes one or more of a fuel cell system, a battery, a recuperative actuator, a supercapacitor, and a thermoelectric generator.

11. The vehicle of claim 1, further comprising a local controller communicatively coupled to the global controller, wherein the local controller is configured to control the first total output power of the first alternate power source based on a first power control signal of the power control signals sent by the global controller, wherein the local controller controls the first total output power using a converter coupled between the first alternate power source and a particular distribution bus of the plurality of distribution buses.

12. The vehicle of claim 1, wherein the power distribution grid further comprises a plurality of switches operable responsive to switching control signals provided from the global controller to cause power to be selectively distributed according to a control algorithm, wherein the plurality of switches includes:
    a first switch electrically coupled to the engine-driven power source and a first distribution bus of the plurality of distribution buses, the first switch operable to selectively decoupled the engine-driven power source from the first distribution bus;
    a second switch electrically coupled to the first alternate power source and a second distribution bus of the plurality of distribution buses, the second switch operable to selectively decoupled the first alternate power source from the second distribution bus; and
    a third switch electrically coupled to the second alternate power source and a third distribution bus of the plurality of distribution buses, the third switch operable to selectively decoupled the second alternate power source from the third distribution bus.

13. A method comprising:
receiving a first signal indicating a first amount of first power having first power characteristics, the first power supplied from a first power source to a first bus of a power distribution system;
receiving a second signal indicating a second amount of first alternate power supplied from a first alternate power source, the second amount of the first alternate power having first alternate power characteristics used by a first subsystem, wherein the second signal is received from a first local controller configured to control an output of the first alternate power source to the power distribution system, and wherein the first alternate power source is an engine-independent power source;
generating, at a global controller of the power distribution system, a first command based on a comparison of the second amount indicated by the second signal to a demand of the first subsystem; and
converting, at a first converter, a first portion of the first amount of the first power from the first bus to produce a third amount of power based on the first command, the third amount of power having the first alternate power characteristics and supplied to the first subsystem.

14. The method of claim 13, wherein the first command is generated based on a determination that the demand of the first subsystem exceeds an available amount of power stored at the first alternate power source.

15. The method of claim 13, wherein the first command is generated based on a determination that the demand of the first subsystem exceeds the second amount of the first alternate power, and wherein the first power source includes a generator and the first alternate power source provides power independently of operation of the generator.

16. The method of claim 13, further comprising:
determining, at the global controller, a fourth amount of second alternate power supplied from a second alternate power source, the fourth amount of the second alternate power having second alternate power characteristics used by a second subsystem; and
sending a second command, from the global controller to a second converter, to cause the second converter to convert a second portion of the first amount of the first power to produce a fifth amount of power having the second alternate power characteristics, wherein the fifth amount of power having the second alternate power characteristics is supplied to the second subsystem.

17. A system comprising:
a local controller coupled to an engine-independent power source and configured to:
generate a first signal corresponding to an available amount of first power from the engine-independent power source aboard a vehicle, and
control an output of the first power from the engine-independent power source to a vehicle subsystem, the first power having first power characteristics; and
a global controller configured to:
receive the first signal,
receive a second signal corresponding to a power demand at the vehicle subsystem,
determine whether the available amount of the first power at the engine-independent power source is less than the power demand of the vehicle subsystem, and
generating a first control signal to initiate conversion of second power having second power characteristics from an engine-driven power source into additional power having the first power characteristics, wherein the additional power is available to the vehicle subsystem.

18. The system of claim 17, wherein the global controller communicates with the local controller regarding a process to be employed by a converter coupled with the local controller to perform power conversion from the second power having the second power characteristics to the additional power having the first power characteristics.

19. The system of claim 17, further comprising a fault manager in communication with the global controller and the local controller, wherein the fault manager is configured to identify a fault condition and to cause the global controller to redirect available vehicle power to correct for the fault condition.

20. The system of claim 17, further comprising a regeneration manager configured to:
identify regenerated power produced by a load included in the vehicle subsystem; and
send a second control signal to the local controller to cause the regenerated power to be stored at the engine-independent power source.

* * * * *